(12) United States Patent
Stahl et al.

(10) Patent No.: US 10,876,219 B2
(45) Date of Patent: Dec. 29, 2020

(54) IN-SITU FINGERPRINTING FOR ELECTROCHEMICAL DEPOSITION AND/OR ELECTROCHEMICAL ETCHING

(71) Applicants: Juerg Stahl, Winterthur (CH); Norbert Schroeder, Dresden (DE); Fred Richter, Dresden (DE)

(72) Inventors: Juerg Stahl, Winterthur (CH); Norbert Schroeder, Dresden (DE); Fred Richter, Dresden (DE)

(73) Assignee: ANCOSYS GMBH, Pliezhausen (DE)

( * ) Notice: Subject to any disclaimer, the term of this patent is extended or adjusted under 35 U.S.C. 154(b) by 1101 days.

(21) Appl. No.: 14/321,910

(22) Filed: Jul. 2, 2014

(65) Prior Publication Data
US 2015/0008132 A1    Jan. 8, 2015

(30) Foreign Application Priority Data
Jul. 2, 2013 (EP) .................................... 13174725

(51) Int. Cl.
*C25D 21/12* (2006.01)
*C25D 7/12* (2006.01)
(Continued)

(52) U.S. Cl.
CPC .......... *C25D 21/12* (2013.01); *C23C 18/1675* (2013.01); *C25D 7/00* (2013.01);
(Continued)

(58) Field of Classification Search
CPC .................................................... C25D 21/12
See application file for complete search history.

(56) References Cited

U.S. PATENT DOCUMENTS 4,479,852 A     10/1984   Bindra et al.
4,631,116 A *   12/1986   Ludwig .................. G01N 27/42
                                                        204/434
(Continued)

FOREIGN PATENT DOCUMENTS

EP     0760473 A1    3/1997
JP     55119162 A    9/1980
(Continued)

OTHER PUBLICATIONS

European Search Report dated Dec. 19, 2013 from corresponding European Patent Application No. EP 13 17 4725.
(Continued)

*Primary Examiner* — Brian W Cohen
(74) *Attorney, Agent, or Firm* — Kriegsman & Kriegsman

(57) ABSTRACT

The invention relates to an electrochemical analysis method for monitoring and controlling the quality of electrochemical deposition and/or plating processes whereby the electrochemical analysis method uses a fingerprinting analysis method of an output signal to have an indicator of whether the chemistry and/or process is operating in the normally expected range, whereby the method utilizes one or more substrates as working electrode(s) and a) whereby the potential between the one or more working electrodes and one or more reference electrodes being analyzed to provide an output signal fingerprint which is represented as potential difference as a function of time or b) the input power of a process power supply to provide input energy in the form of current and/or potential between the working electrode(s) and a counter-electrode whereby the method utilizes the potential between the one or more working electrode(s) and at least one of: one or more reference electrodes; or one or more counter-electrodes; to provide an output signal finger-
(Continued)

print. The invention also relates to an electrochemical system (FIG. 3).

8 Claims, 14 Drawing Sheets

(51) Int. Cl.
    *C25D 7/00*     (2006.01)
    *C23C 18/16*     (2006.01)
    *G01N 27/416*     (2006.01)
    *C25F 3/02*     (2006.01)

(52) U.S. Cl.
    CPC .................. *C25D 7/12* (2013.01); *C25F 3/02* (2013.01); *G01N 27/4166* (2013.01)

(56) References Cited

U.S. PATENT DOCUMENTS

| | | | | |
|---|---|---|---|---|
| 4,814,197 | A * | 3/1989 | Duffy | C23C 18/1683 427/437 |
| 5,223,118 | A | 6/1993 | Sonnenberg et al. | |
| 6,679,983 | B2 * | 1/2004 | Morrissey | C25D 3/02 205/123 |
| 7,368,042 | B2 * | 5/2008 | Hsu | C25D 17/12 204/228.1 |
| 2005/0183958 | A1 | 8/2005 | Wikiel et al. | |
| 2007/0125641 | A1 * | 6/2007 | Rantala | C25C 7/06 204/228.6 |
| 2009/0038952 | A1 * | 2/2009 | Tachibana | C25D 3/38 205/296 |
| 2009/0200171 | A1 * | 8/2009 | Han | C25D 21/12 205/81 |
| 2013/0161203 | A1 * | 6/2013 | Mayer | C25D 21/14 205/775 |

FOREIGN PATENT DOCUMENTS

| | | |
|---|---|---|
| JP | 5926660 A | 2/1984 |
| JP | 2006283151 A | 10/2006 |

OTHER PUBLICATIONS

Arvin et al., "Residual Stress Properties of Nickel and Copper Deposits Used for C4 Interconnects," ECS Transactions, 35(22):15-26 (2011).

* cited by examiner

A schematic of a prior art electroanalytical system that is designed to extract an electrolyte sample and analyze it for process control A schematic of a second prior art electroanalytical system that is designed to extract an electrolyte in-situ

IN-SITU FINGERPRINTING FOR ELECTROCHEMICAL DEPOSITION AND/OR ELECTROCHEMICAL ETCHING

The present invention is directed toward systems for monitoring and controlling the quality of plating processes including bath composition, state of hardware readiness and fingerprint of the processing of the product (substrate) using electrolytic or electroless deposition, or electrochemical etching, techniques.

The prior art for the process control of electrochemical deposition or etching processes involves evaluating each process parameter individually with respect to its control limits. For example, bath analysis tools are used for monitoring the concentrations of each of the constituents of an electrolyte and the deposition tool is used to monitor the deposition time, the bath temperature and such process parameters. This complex industrial use is a univariate approach which leads to high rates of false alarms.

Many products are produced which involve coatings that are deposited on some part of the product using electrochemical deposition techniques. These techniques, as described below, are used to deposit layers of materials such as metals and alloys on a substrate part. The substrate part may comprise a metallic part, a plastic part, a printed circuit board, a wafer for fabricating microelectronic devices, or some other such substrate.

Microelectronic devices are manufactured by depositing and removing multiple layers of materials on a substrate such as a silicon wafer to produce a large number of individual devices. For example, layers of photoresist, conductive materials, and dielectric materials are deposited, patterned, etched, planarized, and so forth to form features in and/or on a substrate. The features are arranged to form integrated circuits (ICs), MicroElectroMechanical Systems (MEMS), and other microelectronic structures.

Wet chemical processes are commonly used to form features on microelectronic substrates. Wet chemical processes are generally performed in wet chemical processing tools that have multiple processing chambers for combinations of cleaning, etching, electrochemical deposition, and rinsing. Electrochemical deposition processes include electrolytic deposition, in which current is applied to the substrate, and electroless deposition, where no external current is supplied to the substrate. In these processes the substrate is immersed in a chamber that includes an electrolyte that supplies the material to be deposited on the substrate. It is also possible to remove material from the substrate by reversing the current through the electrolyte and substrate, or by supplying an appropriate etching solution. These processes can occur in wafer fabrication equipment such as the Raider® system offered by Applied Materials, the Sabre® system offered by Lam Research, the Stratus® system offered by Tel/Nexx, or similar processing tools.

It is customary to include the ability to monitor the chemical constituents or chemical activity of an electrolyte that is being used in one of the aforementioned processes. This is done in order to control the concentrations of the chemical constituents of the electrolyte in such a way as to maintain consistent processing of multiple substrates as the electrolyte is used throughout its lifetime. Commonly, analytical techniques must be developed specifically for each component of an electrolyte in the particular combination and concentrations of constituents that are present in that particular electrolyte. It can be time-consuming and expensive to design the analysis techniques or methods using electroanalytical, HPLC, and titration techniques for each of the constituents of an electrolyte. Furthermore, some commercial additives have two or more components and it may not be possible to separate them without prior knowledge of the chemical species. Monitoring of each of the chemical constituents of these electrolytes can be complex due to the multiple interactions that can occur between the constituents as their respective concentrations change and as the electrolyte ages. Aging of the electrolyte may result in the breakdown of one or more of its constituents due to oxidation, reduction, or catalytic activity, or it may involve interactions with the hardware or substrates that come into contact with the electrolyte over its lifetime, or other contamination.

Several methods of monitoring the constituents of an electrolyte involve electroanalytical methods. One limitation of using these electroanalytical methods in a classical approach is that they require some prior understanding of the appropriate operating range of the chemistry and system before they can be used to determine if the chemical constituent concentrations are "within specification" or not. Commonly, these concentration ranges are used to produce a "training set" of chemical solutions by varying the concentrations of multiple constituents of the electrolyte and by analyzing each of the training electrolytes to determine the impact of changing the concentrations on the analytical result. Such a method can very quickly result in an inordinate number of samples to be used as the training set, due to the number of constituents in the electrolyte and the multiple interactions between these constituents and the responses being generated to represent the concentrations of other constituents. Classically, a separate electroanalytical method is utilized to represent the concentration of each known constituent within the electrolyte. These electrochemical analyses can occur within chemical analysis equipment such as the Real Time Analyzer (RTA) offered by Technic, Inc., the Quali-Line® system offered by ECI Technology, the Ancolyzer® system offered by Ancosys, or similar analysis tools.

One approach that is commonly used to simplify electroanalytical methods and use them to represent the concentrations of chemical constituents is to choose one particular aspect of the electrochemical response and to correlate that aspect to the constituent concentration. The aspect of the response that is utilized may be the height of a particular response peak, the area under a particular response curve, or the ratio of the heights of two response peaks, for instance. While this approach makes it simpler to correlate the specified parameter to the changing concentration of one or more of the electrolyte constituents, it results in ignoring a large proportion of the data that is generated by an electroanalytical technique. This means that the opportunity to evaluate changes in the response in the regions not being considered is lost. These regions may contain information related to breakdown products, chemical contaminants, and such.

FIG. 1 shows a schematic representation of prior art analysis and dosing systems hooked up to an electrochemical deposition tool for depositing metals on microelectronic substrates. In this figure a slipstream is shown coming from the tank of the electrochemical deposition tool and circulating past the analysis system and the dosing system. The analysis system is configured so as to be able to take a sample of the solution as it flows by in the slipstream, and the dosing system is configured so as to be able to inject one or more chemical constituents into the slipstream. The schematic is meant to represent analysis and dosing systems such as those manufactured by Ancosys; Pliezhausen, Germany and ECI; Totowa, N.J. FIG. 2 is a schematic representation of a different analysis configuration, such as the RTA (Real Time Analyzer) from Technic; Providence, R.I. In this configuration a "probe" inside the plating tank is configured to perform electroanalytical analysis of the plating solution. This probe is connected to a computer controller which controls the operation of the probe and the analysis of the electrochemical data that is generated by it.

A further limitation of the common approach of using a training set of solutions with varying constituent concentrations is that they are commonly made by mixing fresh constituents together in order to produce multiple solutions with concentrations that vary in understood ways. This approach neglects any impacts of electrolyte aging on the analytical results. Electrolyte aging can result in oxidation and/or reduction of one or more of the electrolyte constituents as they come in contact with the anode and/or cathode of an electrolytic system. It can also include the build-up of components that were not intentionally added to the electrolyte due to leaching from the system components or from the product substrates (or holders) that are processed by the system. There are also other ways that contaminants could be inadvertently introduced to the electrolyte. Electrolyte aging is an important aspect of most industrial deposition processes and can be responsible for many of the problems that occur on products and materials that are produced utilizing these wet deposition methods. The importance of maintaining chemical constituent concentrations despite these bath aging effects can be appreciated by understanding the use of "bleed and feed" techniques that essentially throw away a proportion of the aged electrolyte and replace it with fresh electrolyte in an attempt to keep the concentrations of compounds associated with bath aging below acceptable limits. These techniques are common in the microelectronics industry, where they are used to maintain the electrolytes of deposition processes at steady-state conditions with low levels of breakdown products and/or bath contaminants. Of course, using bleed-and-feed operation of an electrolyte increases the chemical usage, environmental impact, and associated costs.

The classical methods of electroanalytical analysis involve the extraction of a sample of the electrolyte from the system for analysis. This entails flowing a portion of electrolyte through fluid sampling lines to the point of extraction in order to ensure that the extracted sample has a composition consistent with the electrolyte being used in the processing of product. Some of the electrolyte is also commonly used to rinse the analysis equipment in order to prevent analyzer contamination or "memory" from previous samples. If the analysis frequency is high, or if the volume of electrolyte required for flushing the system and analysis is large, the operation of the analysis system may effectively produce a bleed-and-feed type of operation due to the volume of electrolyte being consumed for analysis purposes, which must be replenished with fresh electrolyte.

The aforementioned electroanalytical methods may be complicated due to changes in reference electrodes or working electrodes used during the analysis. Reference electrodes must be chosen so as to be compatible with the electrolytes they are in contact with, and they must be maintained over their lifetime in order to maintain consistent results. Working electrodes are commonly comprised of rotating disk electrodes which involve electromechanical rotating mechanisms, and are subject to changes in surface roughness or electrode integrity over time.

When a rotating disk electrode is used as the working electrode in an electroanalytical method the electrode is typically cleaned and conditioned in order to maintain consistent results from one measurement to the next. Even so, it is important to monitor the results and frequently calibrate and/or to eliminate electrode drift effects and to know when it is time to implement a more rigorous maintenance procedure or to replace the electrode. Changes in electrode surface area, for instance, can cause changes in the measured response which are not due to changes in the chemistry.

U.S. Pat. No. 5,223,118 teaches a direct method of analyzing the quantity of brighteners and levelers in an electroplating bath. According to this method, a plurality of plating baths where each bath has a known and different quantity of brighteners and levelers are produced. In the following, for each bath, a counter electrode, a cleaned working electrode an a reference electrode is provided and immersed in the bath and for each bath the measured energy output value is correlated with the quantity of brightener, the initial energy output and the change in energy output. Based on these values the quantity of leveler and brightener is determined in a bath of unknown quantities of brightener and leveler. This method uses different working electrodes, namely one working electrode for each of the plurality of plating baths. The working electrodes are suitable metal disks.

EP 0 760 473 A1 relates to a method for evaluation the metal surface state after plating and deposition and during corroding. A metal like aluminium which is already deposited on a substrate is contacted with a solution containing ions to corrode the metal. The electrode potential of the Aluminium alloy layer which is a metallic thin layer for wiring on a semiconductor wafer serving as a semiconductor substrate is measured in the solution containing ions to corrode the metal.

It is the object of the present invention to provide a method for monitoring and controlling the quality of the electrochemical deposition and/or plating processes including bath composition, process chamber and/or the film formation process on the substrate.

The invention relates to an electrochemical analysis method that utilizes one or more substrates as working electrode(s) and analyzes the potential between the one or more working electrodes and one or more reference electrodes during the electrochemical deposition an/or plating process to provide an output signal fingerprint which is represented as potential difference as a function of time. The electrochemical analysis method uses a fingerprinting analysis method to have an indicator of whether the chemistry and/or process is operating in the normally expected range. The method utilizes one or more substrates of the deposition and/or plating process itself as working electrode(s) of the electrochemical analysis method.

Preferably the one or more substrates in this first embodiment comprises one or more substrate wafers or printed circuit boards.

Furthermore, a source of input power can be connected between the one or more substrates and one or more counter-electrodes. The additional source of input power is used to augment the process analysis by supplying an additional source of current and/or potential variation which is used to aid in analysis by generating a waveform that provides information beyond that which would be provided by the process alone.

It is also possible to use the current or potential between one or more substrates and one or more counter-electrodes as an additional input signal.

The invention also relates to an electrochemical analysis method that utilizes one or more substrates as the working electrode(s) and the input power of a process power supply to provide input energy in the form of current and/or potential between the working electrode(s) and a counter-electrode. The method utilizes the potential between the one or more working electrode(s) and at least one of: one or more reference electrodes; or one or more counter-electrodes; to provide an output signal. In this embodiment preferable the one or more substrates comprises one or more substrate wafers.

The electrochemical analysis system may use a fingerprinting analysis method to have an indicator of whether the chemistry and/or process is operating in the normally expected range.

Preferable, an additional waveform of input power is superimposed with the process waveform. The additional waveform is used to augment the process waveform by supplying an additional source of current and/or potential variation which is used to aid in analysis by generating a waveform that provides information beyond that which would be provided by the process waveform alone.

The output(s) of the electrochemical analysis method can be fed into a model that is used to produce a quantitative quality predictor which provides information about whether the chemistry and/or process is operating within the expected range or if it is approaching or has entered an abnormal range of operation.

The present invention is a method of using trace data (electrolyte flow, temperature, substrate rotation or agitation speed) as well as electroanalytical data (plating or etch current, voltage at the substrate, cell voltage) to fingerprint an electrolyte and/or a system for electrochemical deposition or etching to be used as quality monitors for a) readiness of the process chamber including all connections to the substrate, to anodes and such; b) fingerprinting of the film formation process performed on substrates such as silicon wafers or printed circuit boards (PCBs) used to fabricate microelectronic or electronic devices.

The present invention includes a fingerprint method according to the definition of the International Sematech Manufacturing Initiative (ISMI) after which "Fingerprinting" is "A set of data variables associated with the component being fingerprinted sampled at some rate over some period of time, transformed and analyzed using a set of mathematical techniques to generate a result representing the state of the unit during that timeframe." Key characteristics of a fingerprint, therefore, are: a) A well-defined fingerprint points directly to the failing (or drifting) component when its values are out of the normal operating range. b) In contrast with most Fault Detection Classification (FDC) systems, the drill-down process can begin before a fault has been detected. C) Fingerprints often use data that is not generally available to the fab customer and models that require very specific equipment domain knowledge.

The invention preferably utilizes the substrate as the working electrode for the analytical technique. The invention allows the working electrode to be replaced for every measurement by utilizing the substrate itself as the working electrode for each electroanalytical measurement. This technique provides the advantage of always knowing that the working electrode is exactly representative of the product due to the fact that the product is actually used as the working electrode.

A further aspect of the invention provides for a parallel circuit to allow an additional signal to be superimposed upon the waveform that is applied to the substrate during the deposition process. In this form of the invention a signal such as a small amplitude current or voltage sweep can be added to the waveform used for deposition. This superimposed signal is used to modify the input energy used to provide an output signal which is used to monitor the electrochemical deposition system.

In yet a further aspect of this invention, the output(s) of the electrochemical analysis method are fed into a model that is used to produce a quantitative quality predictor which provides information about whether the chemistry (bath health factor) and/or process (equipment health factor) is operating within the expected range or if it is approaching or has entered an abnormal range of operation. The system uses a quality predictor in feedback with a deposition system in order to provide control of the deposition process by adjustment of the process power supply, therefore, the output signal can be used to provide feedback which is used to control the power supply used for the deposition or etch process, as well as the teach points for substrate entry into the electrolyte. (e.g. "Hot entry," where potential is applied to the substrate before it is brought into contact with the electrolyte) Power supplies and substrate handling devices are key components for achieving the desired process results. In this embodiment, the output of the power supply can be varied in order to compensate for a measured characteristic of the analysis in order to compensate for changes that occur through the life of the electrolyte once a correlation to the metrology of the product and/or test substrate is achieved. Alternatively, the feedback may be used to suspend the operation of the process if an output limit associated with poor process performance is approached. In this manner the invention may advantageously be used to extend the life of an electrolyte used in a process or to inhibit the production of inferior products with a process that has drifted away from its ideal operating conditions.

In a final embodiment of this invention, the method may use a quality predictor in feedback with a deposition system in order to provide control of the deposition process by adjustment of the process power supply. The model and quality predictor are designed to learn over time in order to distinguish between normal and abnormal behaviour. Product quality parameters are fed back into the model to help it refine the differentiation between good and bad process results, and to allow it to narrow down the differences between good and bad process results as more data is fed back to the model.

The information collected is used to produce a quality factor or equipment health factor. Factors could comprise any combination of trace data in the way of multivariate statistical approaches like one class support vector machines (OC-SVM), robust principle component analysis (ROBPCA), and so on. The quality factor may be created from electroanalytical results, classical chemistry analysis results, comparisons to expected electrical waveforms, and the like. For electrochemical deposition or electrochemical etching processes the trace data may be grouped to allow the following classes of analyses: a) readiness of the process chamber including connections, anode quality, flow rates or agitation, and so on; b) behavior/readiness of the power supply; c) quality of the substrate (especially seed layer, photoresist, open area); d) behavior of the electrolyte determined via electroanalytical analysis results. The quality factor is then monitored in order to ensure that the products being produced are of sufficient quality. If the quality factor/health factor is seen to be trending toward an unacceptable limit, action can be taken to modify the process in order to improve the quality factor. Correlation between fingerprint data and yield data of the product are mandatory in order to optimize troubleshooting and/or root cause analysis.

One further aspect of this invention is the use of a high speed signal processing device to handle data in the range of milliseconds to nanoseconds. This is particularly helpful for switching on or switching over of a process parameter (for example, deposition current). Required data rates depend on the process parameter being monitored, but the capability of the high speed signal processing device should span a data acquisition range from nanoseconds to minutes.

BRIEF DESCRIPTION OF THE DRAWINGS

FIG. 13a is a graph of the impedance as a function of frequency. FIG. 13b is a graph of the impedance phase shift as a function of frequency. FIG. 13c is a Nyquist plot, or a graph of the imaginary component of impedance as a function of the real component of impedance.

DETAILED DESCRIPTION

Figure 1:
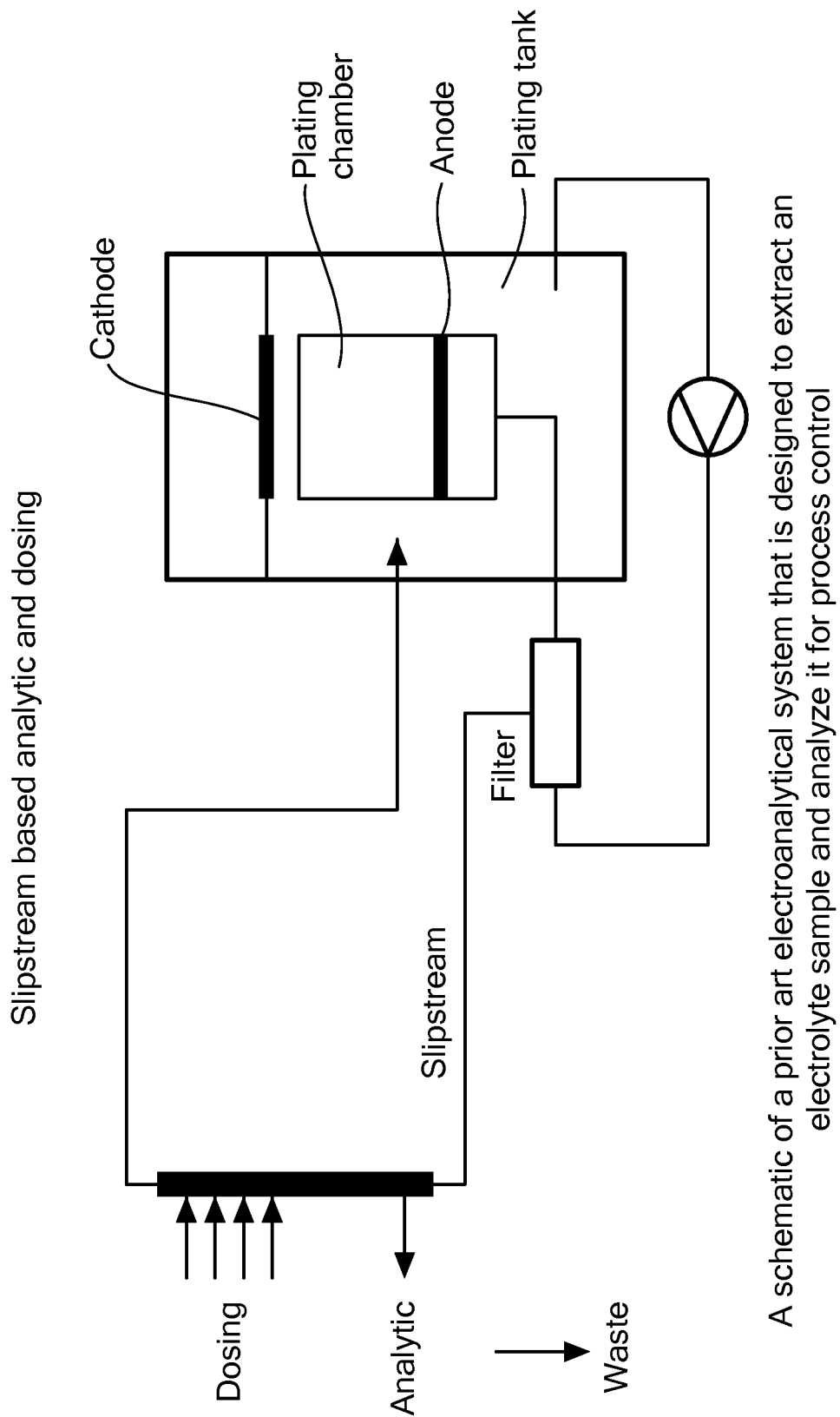
FIG. 1 is a schematic of a prior art electroanalytical system that is designed to extract an electrolyte sample and analyze it for process control. (Ancolyzer/ECI).
Figure 2:
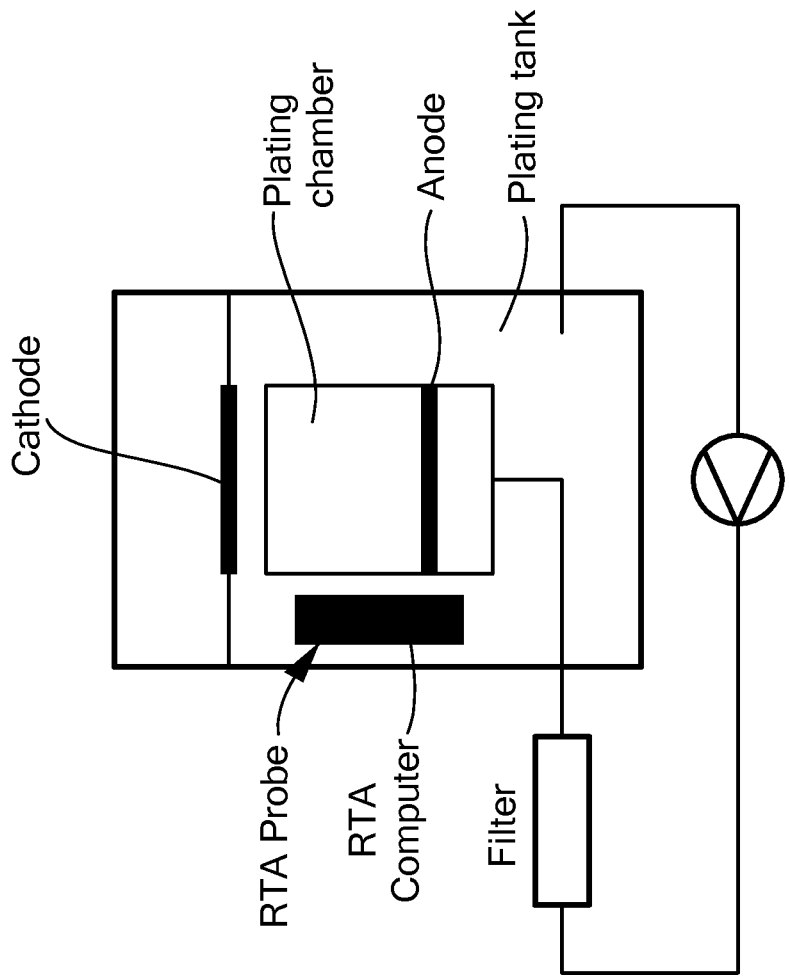
FIG. 2 is a schematic of a second prior art electroanalytical system that is designed to analyze an electrolyte in-situ. (RTA).
Figure 3:
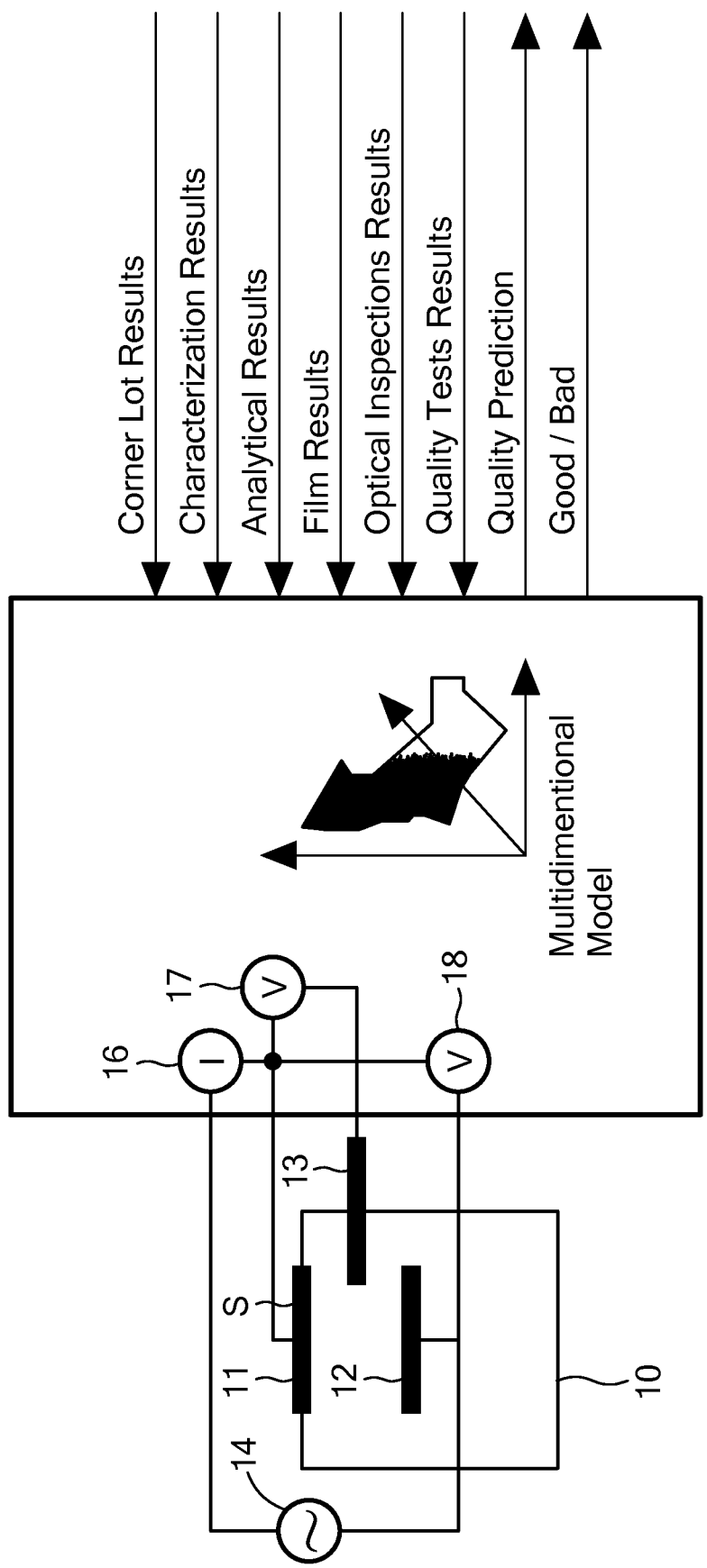
FIG. 3 is a schematic illustration of one embodiment of the present invention.
Figure 4:
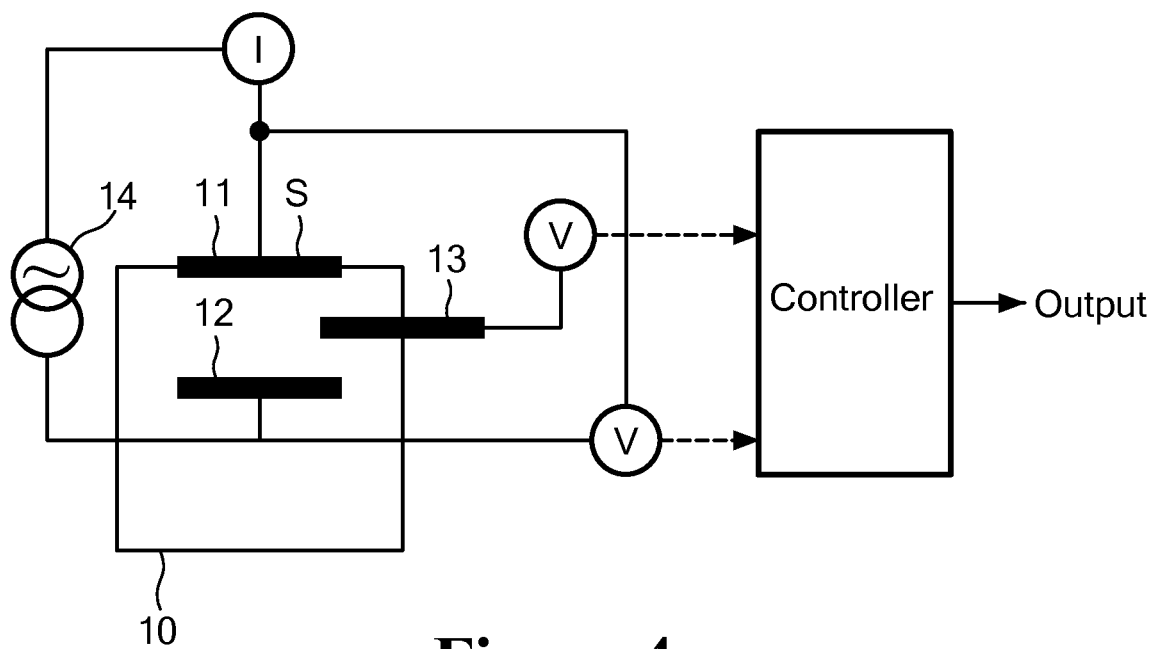
FIG. 4 is a schematic illustration of a hardware embodiment of the present invention.

The present invention is a method of using electroanalytical techniques to fingerprint an electrolyte and/or a system for electrochemical deposition or etching and creating a quality monitor, or health factor, that represents: a) readiness of the process chamber including all connections to the substrate, to anodes and so on and/or b) fingerprinting of film deposition processes performed on microelectronic substrates such as silicon wafers or printed circuit boards or interposers or any other form of electronic substrates. The invention preferably utilizes the substrates as the working electrode 11 for the analytical technique. A schematic representation of one embodiment of the present invention is shown in FIG. 3. The schematic representation further comprises a counter-electrode 12, a reference electrode 13, a power supply 14, a plating chamber 10 and instruments 16, 17, 18 for measuring the current and the voltage. The figure shows how the electrochemical data generated from monitoring the electrical process variables can be fed into a multidimensional model along with other data representing process parameters and process results. The model can use an algorithm operating on the data fed to it to produce a quality prediction representing the probability of the next product to be run in the process having good or bad process results. The invention allows the working electrode to be replaced for every measurement by utilizing the substrate itself as the working electrode for the electroanalytical measurement. A schematic representation of a set of hardware that would be useful for this invention is shown in FIG. 4.

Figure 3A:
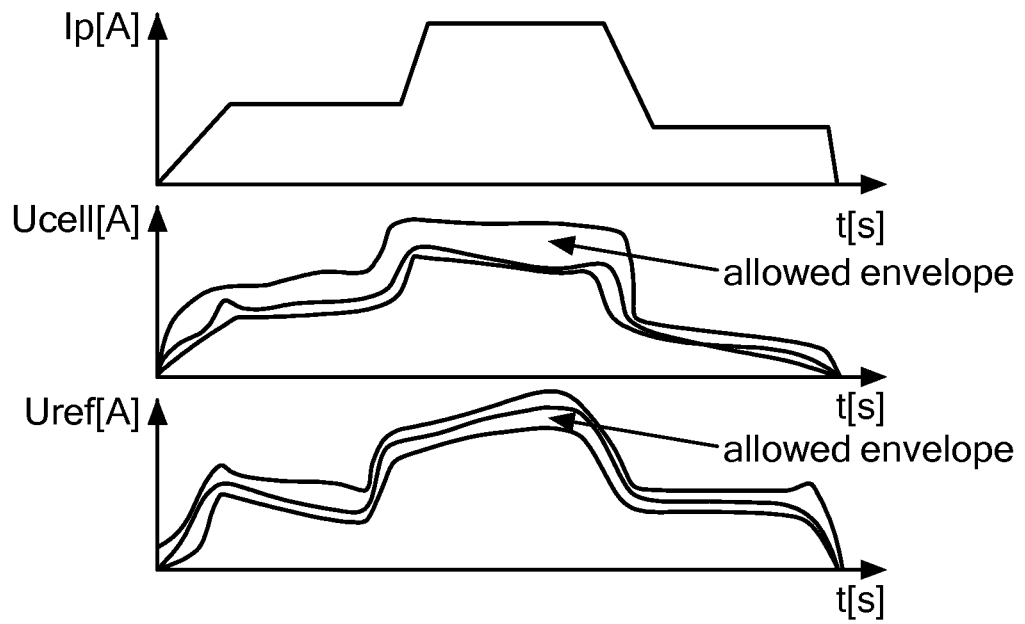
FIG. 3a explains the principle of the inventive method in diagrams of the current $I_p$, and the voltages $U_{Cell}$ and $U_R$ with the enveloping upper and lower lines defining the range of good and bad quality.

FIG. 3a further explains the principle of the inventive method. The figure shows the plating current $I_p$; the expected voltage of the cell $U_{cell}$ (small black line) and the expected voltage for the reference $U_R$ (small black line) for a coated substrate of good quality. The expected lines of $U_{cell}$ and $U_R$ are each enveloped by an upper and a lower line. The region between the upper and the lower lines define the region of the cell voltage $U_{cell}$ or voltage of the reference $U_R$ of good quality.

In the regions above the upper line and below the lower line the expected quality of coated substrates are not good.

After having defined the quality of different substrates and the current $I_p$ and/or the voltage $U_{cell}$ or $U_R$ for several substrates, the quality of a further substrate can be predicted by measurement of $I_p$, or the voltage $U_{cell}$ or $U_R$ of the further substrate.

Each new determination of the quality of the substrate and the voltage or current will lead to a revised model.

The current $I_p$, the voltages $U_{cell}$ or $U_R$ are measured with the measuring instrument 16 and the voltmeters 17, 18 in FIG. 3.

When the substrate is being used as the working electrode for an electrochemical measurement some limitations and complications arise which must be taken into account. It is common for a manufacturer of microelectronic devices to use the same facility and equipment to manufacture multiple product types. Each product type is likely to have a unique surface area and potentially different operating waveform due to its particular product requirements. Therefore, each product type will need to be compared separately, perhaps through the use of a lookup table or such, in order to have consistent results from the method of this invention. The parameters used to separate the product into categories may include product type, process chamber(s) utilized, previous process equipment parameters, and the like. The data may be considered with each value of each parameter separated out, or in an aggregated form considering all values of all parameters in a single data set. Additionally, there is likely to be variation within a product type due to normal manufacturing variations in the lithographic processes, for instance, which will need to be accounted for in the methods described here.

Figure 5:
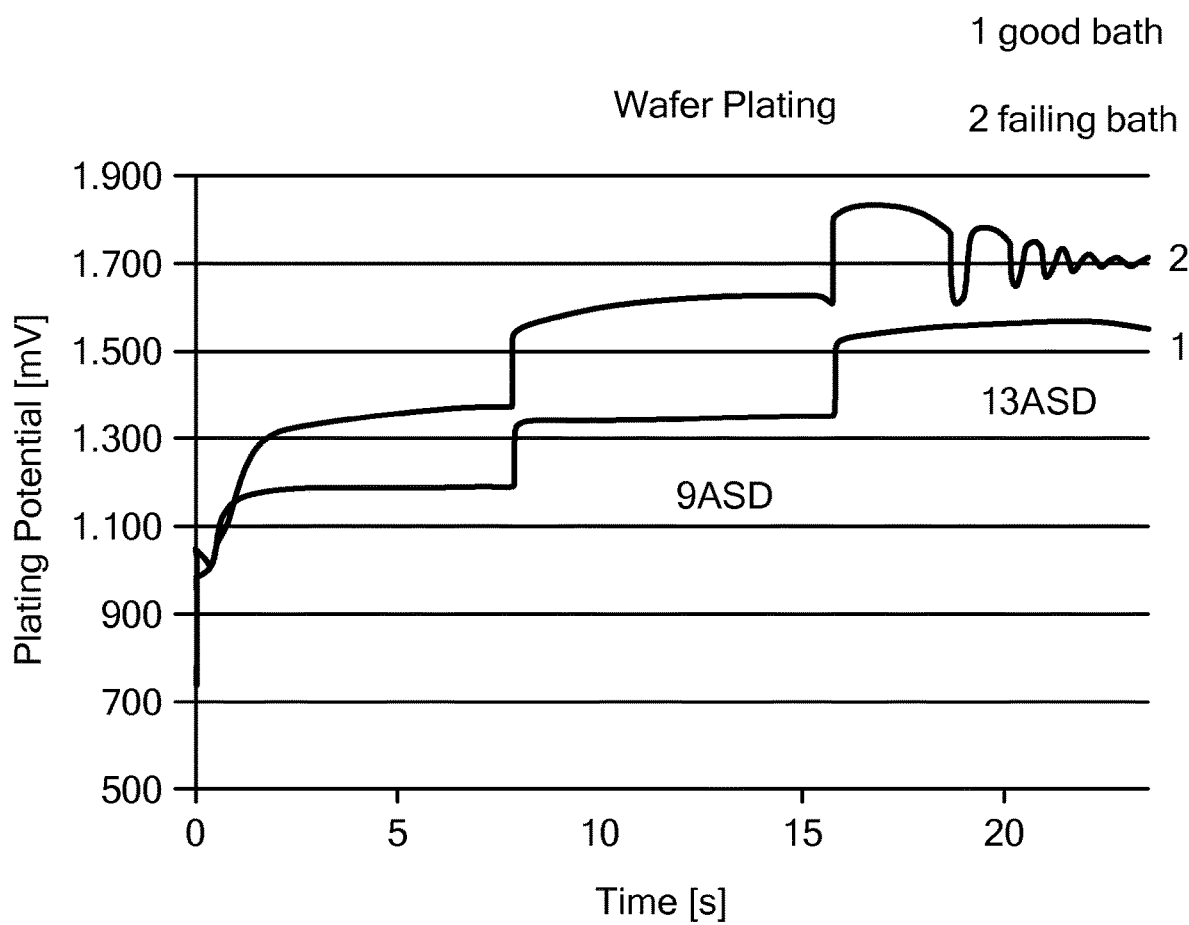
FIG. 5 is a graph showing electrochemical analysis response curves that were obtained using a process similar to the one used for plating substrates showing signals from a good bath and a degraded bath. The signal from the degraded chemistry shows more polarization at each applied current, as well as potential fluctuation at 13 ASD applied current.

One advantage of using the product substrate as the working electrode in the gathering of electrochemical response data is that there is no need to fabricate or design a method that represents the process being performed on the product, because it is exactly this process which is providing the data used to analyze the process. There is no danger of the applied current (or voltage) being too low or too high to capture some characteristic performance of the chemistry that occurs only within a narrow range used on the product substrate, because it is that very process that is used to generate the data being used for analysis. FIG. 5, for example, shows two curves generated during electrochemical deposition and analysis. These curves show differences between a good electrolyte (1), and a failed one (2) which produced substrates with deposition occurring in some locations and not in others. Once the deposition is begun with the failed electrolyte the potential climbs higher than with the good electrolyte. Furthermore, during the highest current density step, the potential is observed to fluctuate in the case of the failed electrolyte. Only when the applied current is higher than 9 ASD is the potential fluctuation seen in the response of the method, indicating the potential for a problem on the substrate.

The example shown in FIG. 5 is taken from an experiment where pieces of a patterned silicon wafer were subjected to an electrochemical deposition process with multiple current density steps. It was observed that the failed bath produced results on the wafer with some bump features plated properly (or higher than normal), while others had very short bumps. Based on troubleshooting done on the process, it was observed that the differences in deposits from the failed electrolyte, as compared to normal "good" electrolyte, occurred only during the highest current density step of the deposition process. While the failed electrolyte exhibits higher potential during the first steps of deposition, it is only during the 13 ASD step that the potential response exhibits the oscillating behavior that indicates that there may be an issue with some areas that have little or no deposition occurring while other areas of the substrate experience normal deposition. It is the correlation of this data "fingerprint" acquired during the processing of the product substrate to the observed failure on the product that makes the invention disclosed herein so powerful. The data provides a direct indication of the performance of the process on the product that can be used to improve the process control.

In order to utilize the product substrate as a working electrode in this method it is desirable to incorporate a reference electrode into the deposition system in a manner such that it is in electrochemical communication with the working electrode(s). In the foregoing discussion the product substrate was described as the working electrode. It is also within the scope of this invention to use the cell voltage and/or cell current (between the product substrate electrode and the anode(s), or counter-electrode(s)) as yet another set of trace data that indicates the performance of the system as a whole. In this respect, it would be feasible to have a relatively simple electrochemical processing system such as those shown in FIGS. 4 and 6 that utilizes the signals between the product substrate and the reference electrode, and between the product substrate and the counter-electrode as analytical signals. It is also possible to include signals between the counter-electrode and a reference electrode.

Figure 6:
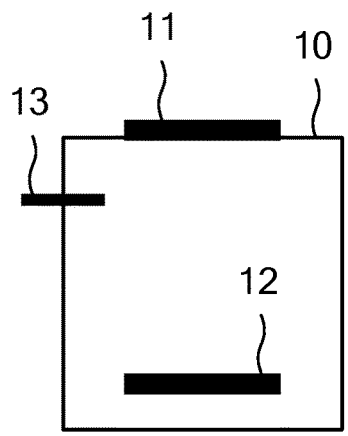
FIG. 6 is a schematic representation of an implementation of a reference electrode in an electrochemical deposition reactor.
Figure 8:
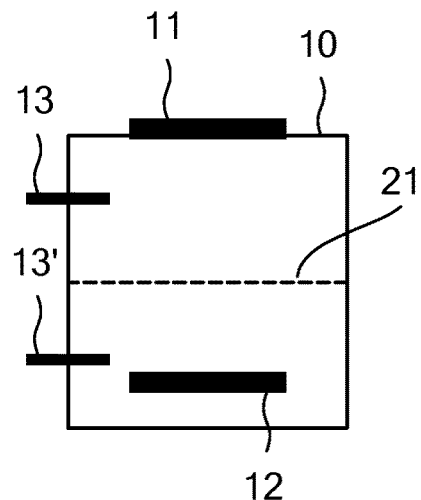
FIG. 8 is a schematic representation of an implementation of reference electrodes in an electrochemical deposition reactor with a membrane 21.
Figure 7:
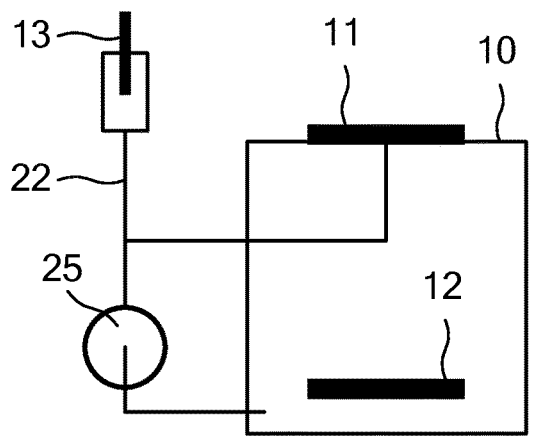
FIG. 7 is a schematic representation of an implementation of a reference electrode in an electrochemical deposition reactor with a capillary tube 22 and a pump 25 to ensure electrolyte flow through the capillary tube.
Figure 9:
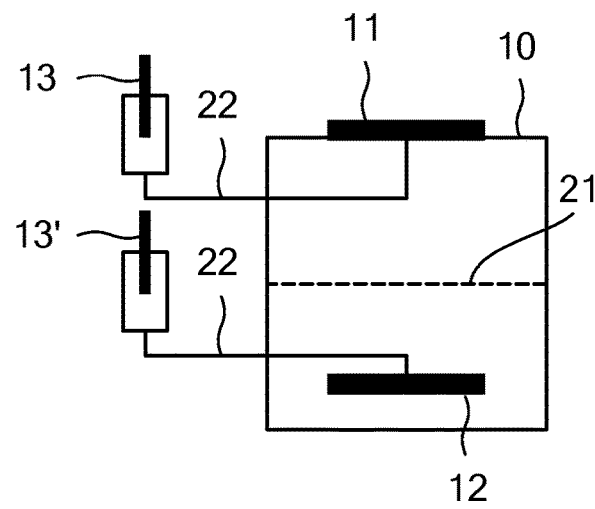
FIG. 9 is a schematic representation of an implementation of reference electrodes in an electrochemical deposition reactor with a membrane and capillary tubes.
Figure 10:
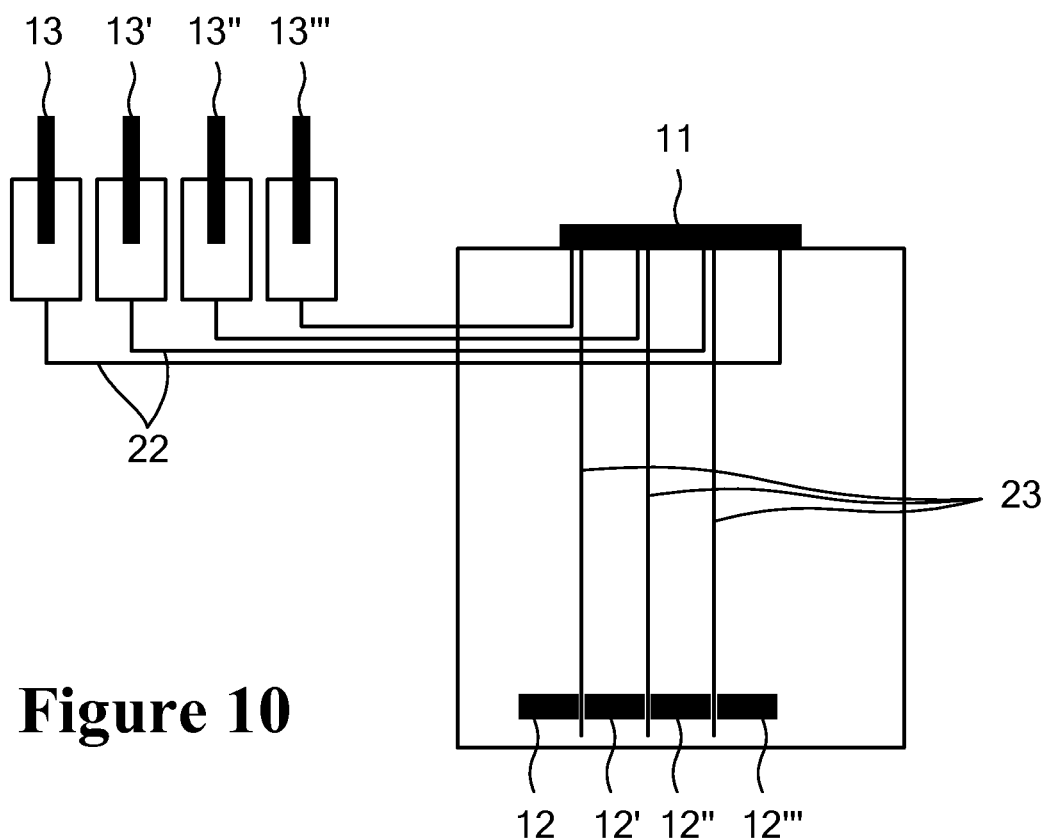
FIG. 10 is a schematic representation of an implementation of reference electrodes 13 in an electrochemical deposition reactor with four concentric anodes 12 and capillary tubes 22 between the reference electrodes 13 and locations near the cathode substrate 11.
Figure 11:
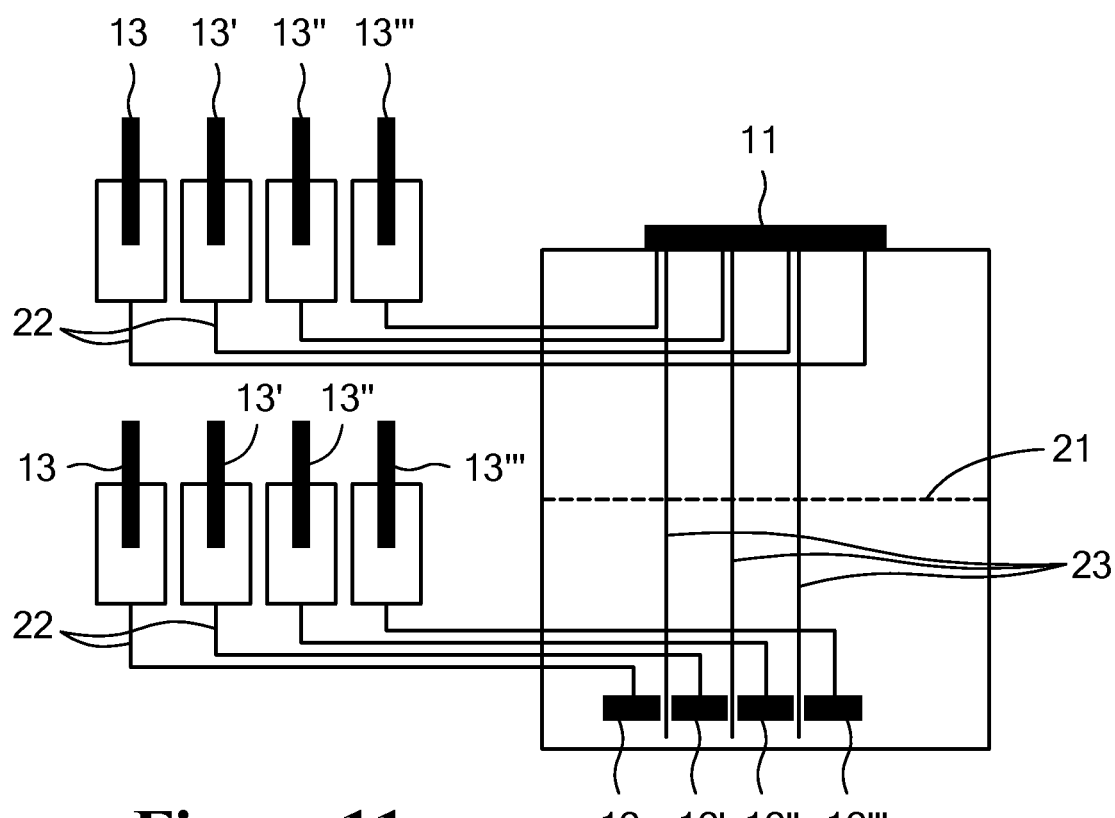
FIG. 11 is a schematic representation of an implementation of reference electrodes 13 in an electrochemical deposition reactor with four concentric anodes 12 and membrane 21 separation between the cathode 11 and anodes 12 and with capillary tubes 22 between the reference electrodes 13 and locations near the electrode surfaces.
Figure 12:
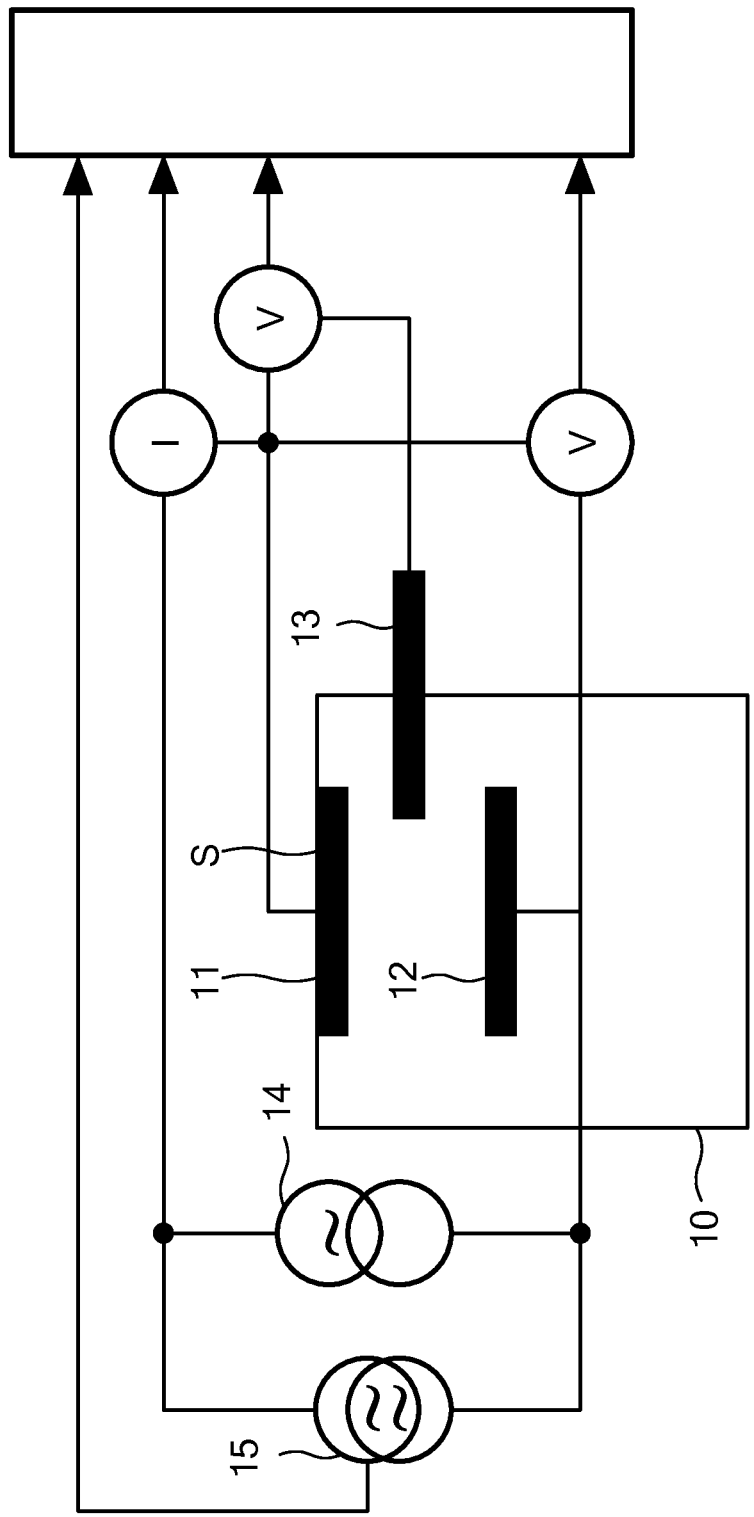
FIG. 12 is a schematic illustration of an alternative embodiment of the present invention which includes a parallel circuit that supplies a superimposed waveform for electrochemical analysis on the process waveform.

As will be appreciated by one of ordinary skill in the art, a system as described in FIG. 6 may be extended to more complex deposition systems, such as those that utilize multiple cathodes and/or anodes, or with membranes providing for separation of electrolytes into specific fluid systems. It may be desirable to add reference electrodes to the system to allow for the measurement of the potential of multiple cathodes and/or anodes. It may also be desirable to utilize devices such as capillary tubes to allow for measurement of potential differences near the associated working electrode without having to have the reference electrode in close proximity to the working electrode. This provides a method for monitoring the potential near the electrode with minimal disruption of the electrical fields in the deposition reactor itself. It may also be advantageous to have a fluid pumping system associated with a capillary tube for a reference electrode in order to keep the electrolyte in the capillary tube mixed and in similar concentrations to the plating electrolyte, and to purge air bubbles from the capillary tube (see FIG. 7). It will be recognized that the ideal system for analysis will be somewhat dependent on the particular deposition system being utilized. Several representative configurations for various deposition systems are shown in FIGS. 4 and 6-12.

When the system is used in a configuration that includes one or more ion-selective membranes 21 there may be an electrolyte in one of the fluid systems that comprises an acid solution. Acid solutions based on acids such as sulfuric acid or methane sulfonic acid are commonly utilized. When this is the case, it may be advantageous to monitor this solution in order to identify contamination or changes of the electrolyte. In this respect, an embodiment of this invention would be to use a fingerprinting analysis technique to identify contaminants in this electrolyte. This fingerprinting analysis technique may utilize an electrode in the deposition system as a working electrode for the analysis, and may optionally include a parallel electronic circuit for superimposing an additional analysis waveform, as described elsewhere in this application. Such contaminants may be introduced, for example, through migration of materials through one or more membranes that are part the system. This could be due to normal operation, the generation of a contaminant due to reactions in the system, or through a manufacturing problem with one or more of the electrolyte components that results in contaminated feedstock. This invention provides for a capability of identifying the presence of a contaminant such as an organic compound in an electrolyte that comprises an acid such as sulfuric acid or methane sulfonic acid.

Examples of other acid electrolytes that may be tested with this method include formic acid, ethanoic acid, propanoic acid, butanoic acid, and sulfonic acids as aliphatic or non-benzene alicyclic compounds of the general formula (I) wherein R is a $C_{1-5}$ alkyl radical or carbon ring structure,

$$(X_1)_n\text{—R—SO}_3H \tag{I}$$

$X_1$ is a halogen atom or hydroxyl, aryl, alkylaryl, carboxyl, or sulfonyl radical which may be in any optional position of the alkyl radical, and n is an integer of 0 to 3. Examples of these organic sulfonic acids are methanesulfonic, ethanesulfonic, propanesulfonic, 2-propanesulfonic, butanesulfonic, 2-butanesulfonic, pentanesulfonic, chloropropanesulfonic, 2-hydroxyethane-I-sulfonic, 2-hydroxypropane-I-sulfonic, 2-hydroxybutane-I-sulfonic, 2-hydroxypentanesulfonic, allylsulfonic, 2-sulfoacetic, 2- or 3-sulfopropionic, sulfosuccinic, sulfo-maleic, sulfofumaric, benzenesulfonic, toluenesulfonic, xylenesulfonic, nitrobenzenesulfonic, sulfobenzoic, sulfosalicylic, and benzaldehydesulfonic acids. Furthermore, as described elsewhere in this disclosure, the present method is capable of generating a training set of information during normal operation, and it is capable of refining its ability to identify contaminants over time by "learning" as additional data are generated and fed back to the system. A training set of contaminated and uncontaminated electrolytes can be generated as the method is used to analyze electrolyte samples. The training set may include at least one
aged electrolyte. Aged electrolyte is produced by using the electrolyte in an electrochemical process. As described elsewhere in this application, it would also be apparent that a quantitative quality factor, or bath health factor, could be generated from the data produced by this method which could represent the quality of the electrolyte chemistry.

An additional aspect of this invention is that the model and quality factor are designed to learn over time in order to distinguish between contaminated and uncontaminated electrolytes. Electrolyte quality parameters are fed back into the model to help it refine the differentiation between contaminated and uncontaminated electrolytes, and to allow it to narrow down the differences between contaminated and uncontaminated electrolytes as more data is fed back to the model. The model can be created which represents the quality of the process output, and the system can learn the process behavior over time as the process continues to run. This allows a process to be monitored by this method without prior knowledge of the failure modes of the process. It is advantageous to provide feedback to the model when any problem occurs with the products being produced by the process. In this manner, the responses that were captured when the defective product was produced can be associated with the defect that is observed, and can be used by the system to set an appropriate limit that can be used in the future to flag the manufacturer when such a limit is approached. In this manner, the system can be used to prevent the re-occurrence of a failure once the failure information has been fed back into the model.

A model can be created from an unspecified number of process vectors by simply collecting the information for each vector associated with a particular product substrate as it is being processed. It is not necessary to know a priori what values are desired for a particular vector. The information is captured, and the quality attributes of goodness or badness may be associated with the particular substrate as the information becomes available. In this manner, the system effectively "learns" which values are associated with good and bad product results over time.

In order to ascertain proper performance of the process trace data is monitored and analyzed. Collecting trace data is carried out through sampling or measuring at regular or irregular time instances and calculation of resulting quantities. In the first step feasibility sets for each point of the trace data are defined by means of test runs and engineers' expertise. This provides simple intervals for some data points and more complex sets for others, for example, compact ranges described by envelopes for time based trace data. A process is ranked among performing normal if each point of the trace data collection falls in its corresponding feasibility set. Equivalently, an outlier or abnormal behaving process, respectively, is identified by one or more points of the trace data being located outside of their region of feasibility.

In a next step, the occurrence of outliers is analyzed by identifying (local) critical ranges and quantities derived from the trace data which reflect the deviation from normally behaving processes most closely, involving the definition of key performance indicators (KPI). Based on those KPIs, a methodology is established which provides assistance for deciding a priori whether a prospective process is feasible or not. There is a large variety of well-established deterministic as well as stochastic classification models, ranging from linear classifiers like Fisher's linear discriminant and principal component analysis (PCA) to support vector machines (SVM), neural networks and vector quantization, which can be used as basis for the definition of the decision model.

Over time, the decision model can be refined and improved by both adapting decision thresholds or feasibility sets due to growing trace data collection, or training sets, and adding new KPIs because of a growing diversity of outliers, leading to an increased dimension of the model. An advantage of this method of operation is that a training set can be produced during normal operation. This allows the training set, or feasibility set, to be augmented and improved over time as the process runs, and it reduces the cost of process startup by not requiring an extensive training set of data to be generated before running product through the process.

Having to monitor processes in a number of chambers, a decision model is established for each chamber independently. In order to control and being able to compare the different processes in various chambers, the core of the individual decision models should be identical. Considering that processes for different products worked on in different or even same chambers are similar in some sense and, thus, are assessed by the same trace data, the same KPIs can be utilized in each chamber, regardless of the specific occurrence of outliers. That provided, the same decision model can be used throughout where only the feasibility sets, e.g., decision thresholds and envelopes, differ from chamber to chamber. By designing chamber specific transfer functions, the variation in the shape of the feasibility sets can be adjusted, which provides a tool for chamber matching and controlling processes for different products.

The foregoing discussion related mainly to the use of the disclosed systems and techniques for the analysis of electrolytic deposition processes, where an imposed current (or potential) is used to supply the energy needed to deposit material onto a substrate. In the class of processes known as electroless deposition and immersion deposition, the driving force for the deposition comes from electrochemical potentials within the chemistry or between the chemistry and the substrate. In these processes there is typically no external electrical circuit, and the substrate is electrically floating, or in open circuit with the electrolyte. In such a system, the foregoing invention can still be applied by installing a reference electrode in fluid communication with the substrate as it is being processed, and by monitoring the potential between the substrate and the reference electrode. The addition of a counter-electrode to the system also provides the ability to superimpose a low amplitude current or potential waveform on the zero current conditions typically associated with electroless or immersion deposition, as will be discussed below. Other aspects of this invention may advantageously be applied to electroless deposition or immersion deposition processes by the addition of an appropriate reference electrode to the system.

One of the main characteristics that differentiates this invention from any prior art is that the product substrate, such as a wafer, is utilized as the working electrode for an electroanalytical method. This means that data generated from the process itself is used to "fingerprint" or monitor the process responses and make sure they are within a normal operating range or feasibility set. Additionally, the electroanalytical results may be combined with other information collected from or about the system as inputs to a model that predicts the quality of the process output. This method of capturing electrochemical data from the product as it is being processed and effectively using the product itself as a single-use working electrode for electrochemical analysis is unique and has not been used in the electrochemical deposition industry to our knowledge.

In another embodiment, the main differentiator of this method of analysis is that characterization of a large number of solutions as a training set is not required in order to provide feedback on a process or electrolyte. The information regarding a chemistry or process can be gathered over time and compared to the previously acquired set of data. In this manner, it is possible to determine the normal range of the output data, and also to correlate abnormal data to undesirable chemical or process characteristics as these data are produced and identified over time.

The advantages that are obtained using this invention include the ability to begin running a process sooner, without waiting for the completion of extensive (and expensive) characterization of electrolyte analysis techniques to have bath component analyses available to be used for bath regulation or replenishment. They also entail the ability to get quick quality feedback while the process is running, on a per-substrate basis. The learning ability of the process also allows the control system to get better as the process is run for a longer period of time and the feasibility set is increased. The ability to monitor the electrolyte as it is being used, without extracting a sample for analysis, also provides the opportunity to reduce the consumption of chemistry and possibly to increase the bath life.

A further aspect of the invention provides for a parallel circuit to allow an additional signal to be superimposed upon the waveform that is applied to the substrate during the deposition process. An example of this is shown schematically in FIGS. 13a, 13b and 13c. In this embodiment of the invention a signal such as a small amplitude current or voltage sweep resulting from an additional source 15 can be added to the waveform used for deposition. This superimposed signal can then be used to provide an output signal which is used to monitor the electrochemical deposition system and process.

The signal that is superimposed with the process waveform is designed such that it will not adversely impact the process results when it is added to the normal process waveform. Such considerations may lead to current or potential changes of up to 10% of the normal process current or potential. More preferably, the change in current or potential may be less than 1% or 2% of the normal process value. The process impact on the product will need to be determined on a case by case basis and will be dependent on the particular process being performed, the sensitivity of the product to variations in the waveform utilized during the process, and the particular waveform being superimposed on the process waveform. The superimposed waveform is to be determined in a way that provides additional information in the electrochemical analysis results without adversely impacting the product that undergoes the electrochemical deposition process in most cases.

The superimposed waveform will normally be chosen such that it provides a small change, relative to the normal process waveform. Exemplary waveforms that could be superimposed with the process waveform include, but are not limited to, low amplitude voltage or current sweeps with a triangular time-dependent shape, low amplitude voltage or current sweeps with a sinusoidal time-dependent shape, low amplitude voltage or current steps, low amplitude current modulation with varying frequency, or similar variations that provide current and/or potential outputs that can be used to provide electrochemical information about the process or chemistry being used.

The result of providing an additional waveform that is superimposed with the process waveform can be to provide the ability to perform additional electrochemical analysis on the process and/or on one or more of the electrolytes used in an electrochemical deposition or etching process. This could provide analysis results such as electrochemical impedance spectroscopy, cyclic voltammetry, step voltammetry, or the like. A suitable waveform or waveforms can be chosen so as to provide a set of electrochemical analysis results that are likely to be responsive to changes in the electrolyte or electrolytes being monitored, or to changes in the process or hardware that is used to perform the process. It is also expected that the analysis results would be responsive to variations in the incoming product as the electrochemical deposition process is being performed on such product.

An experiment has been performed in which a portion of a semiconductor wafer substrate was subjected to an electrochemical deposition process representative of a portion of an electrochemical deposition process used for depositing tin silver solder alloy, similar to that shown in FIG. 5. The 9 amp per square decimeter (ASD) current density step was used, but with a small amplitude current variation superimposed with the DC current level. The small amplitude current variation was of varying frequency in order to allow impedance spectroscopic analysis of the signal. This small amplitude signal consisted of a 2% change in the DC current level. The experiment was performed with two chemistry samples: one of which provided good process results on semiconductor wafer substrates, and the other which provided deleterious process results on the same type of substrate. The deposition from the second solution resulted in a bimodal deposition behavior in which some bumps were deposited with an abnormally low deposit thickness, while other bumps were deposited in a more normal manner, resulting in thick bumps due to the slightly increased current available.

When this experiment was performed using chemistry that provided good deposits, the deposit was as expected, even after adding the small amplitude current variations to the normal DC current. Therefore, this same approach could be used with real product substrates.

Figure 13A:
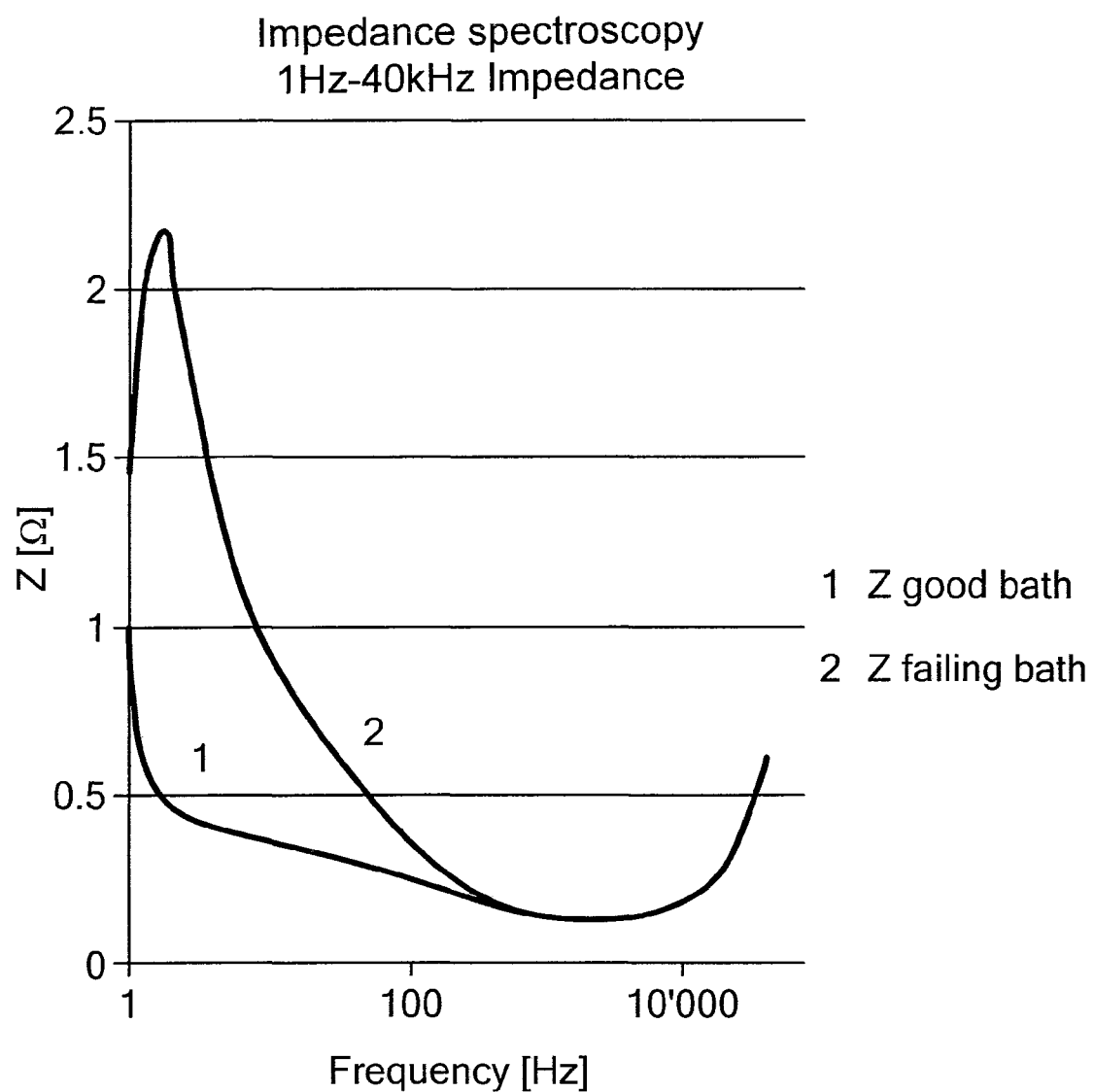
FIGS. 13a, 13b and 13c constitute a set of graphs from an electroanalytical analysis technique that involves superimposing a small analysis current perturbation with a process current. A 2% current density variation was superimposed on a 9 ASD process current in order to generate these graphs.
Figure 13B:
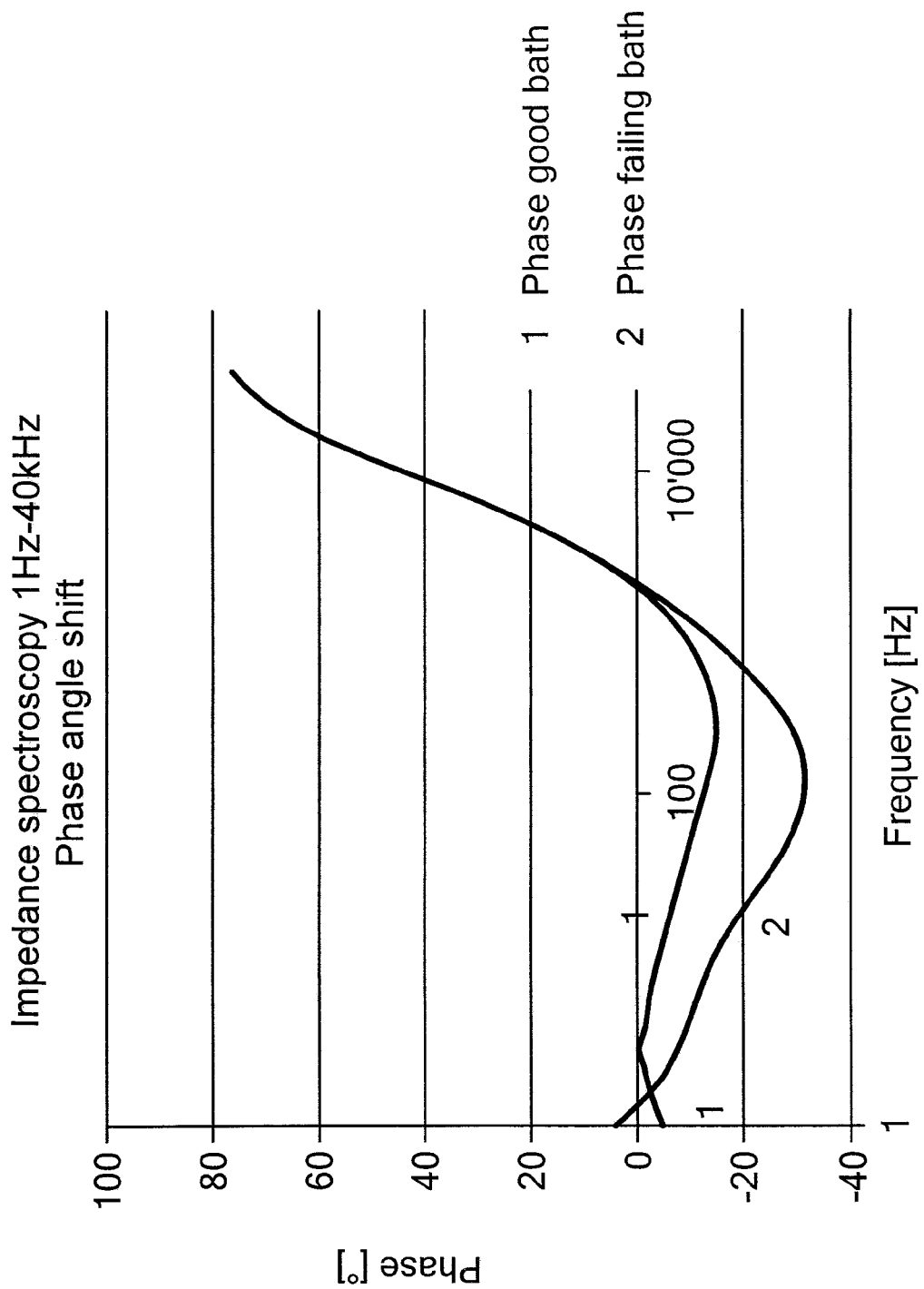
Figure 13C:
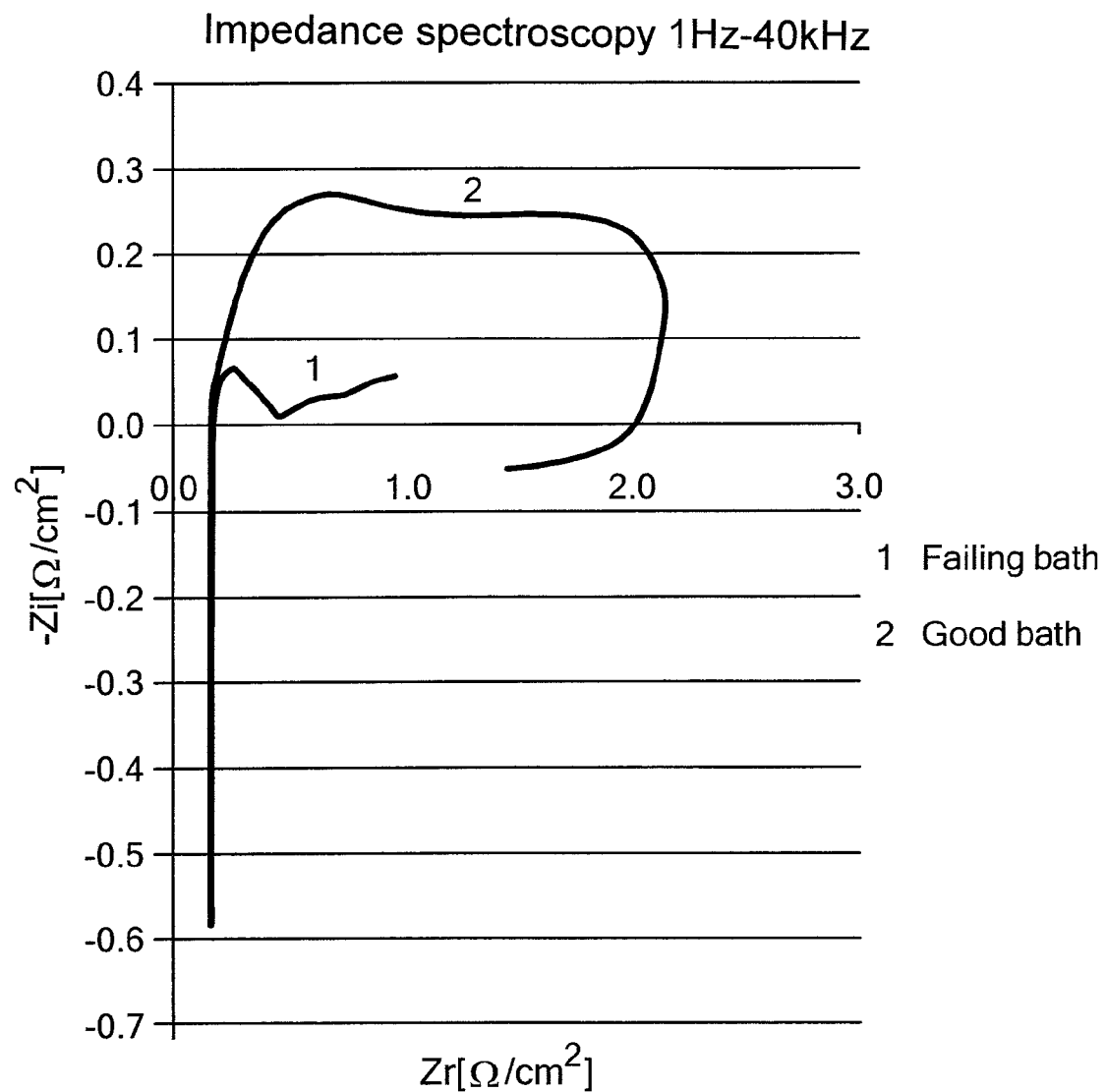
Figure 14:
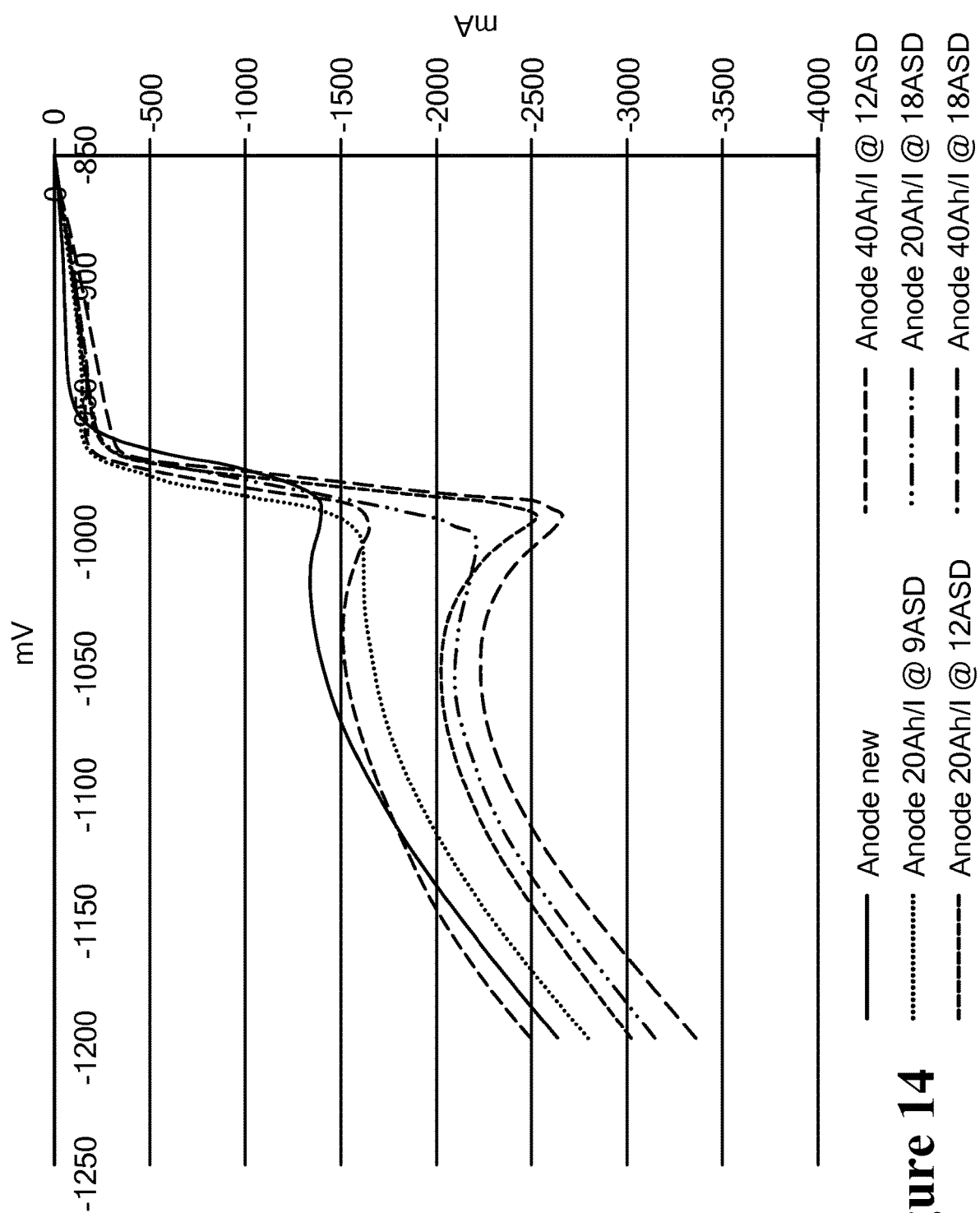
FIG. 14 is a set of electrochemical analysis response curves, showing that a signal representing the possibility of degraded process performance occurs as a result of aging a tin plating bath in the presence of inferior anodes.

As seen in FIGS. 13a, 13b and 13c, there was a significant difference in the electrochemical results from these two samples, which could be used to identify when there is an issue with the chemistry. This type of fingerprint analysis adds additional capability by making a small modification to the normal process electrical waveform. FIG. 13a shows the real impedance values as a function of frequency for the two chemistries described in the paragraph above. FIG. 13b shows the difference in the phase angle plotted against frequency. FIG. 13c shows the difference in results for the same two baths in the form of the imaginary component of impedance as a function of the real component of impedance, commonly referred to as a Nyquist plot. Taken together, the plots in FIG. 14 demonstrate the ability to differentiate the good chemistry from the chemistry that has been modified due to operation and produces poor results on product substrates.

As suggested above, the electrochemical analysis methods described herein may be sensitive to variations in parameters such as: electrical contact resistance at the cathode or anode, seed layer thickness or resistivity, power supply output, product contamination or residues, chemical contaminants in the electrolyte, surface area subject to the process, or electrolyte constituent concentrations. The methods described herein may therefore be very powerful in monitoring changes in the electrochemical deposition process or in the electrolytes used for the process.

TABLE 1

| Problem | Effect | Response | Preferred Trace Data Resolution |
| --- | --- | --- | --- |
| Cathode Contact Resistance | Impedance Increase | Stop Process | sec |
| Anode Contact Resistance | Impedance Increase | Stop Process or Modify Process | sec |
| Contact Resistance (general) | Impedance Increase | Stop Process | sec |
| Seed Layer Thickness Variation | Impedance Change | Modify Process | msec |
| Seed Layer Resistivity Variation | Impedance Change | Stop Process | msec |
| Stray Current in the System | Currents do not Sum | Stop Process | msec |
| Power Supply Output Variation | Various | Stop Process | msec |
| Product Contamination or Residue | Various | Stop Process | msec |
| Electrolyte Contaminant | Various | Modify Process | msec |
| Active Surface Area Variation | Various | Modify Process | msec |
| Electrolyte Constituent Concentration Variations | Various | Replenish | msec |

Table 1. Problems that can be detected using the disclosed analysis method, effects that can be used to diagnose the problems and responses that can be initiated after the problems are detected.

In yet a further aspect of this invention, the output signal can be used to provide feedback which is used to control the power supply used for the deposition process. In this embodiment, the output of the power supply can be varied in order to compensate for a measured characteristic of the analysis in order to compensate for changes (such as current efficiency) that occur throughout the life of the electrolyte, and/or as anodes are used or consumed. This mode of operation allows the process to be adjusted such that its useful life can be extended beyond what it would have been without such an operational scheme. The output of the analysis or a model that is based on the analysis data can be used to adjust the operating parameters of the process in order to keep the product within its specifications. For instance, if the electrolyte changes as it ages, the power supply output could be adjusted in a way that keeps the process producing the desired deposit properties on the product.

Figure 15:
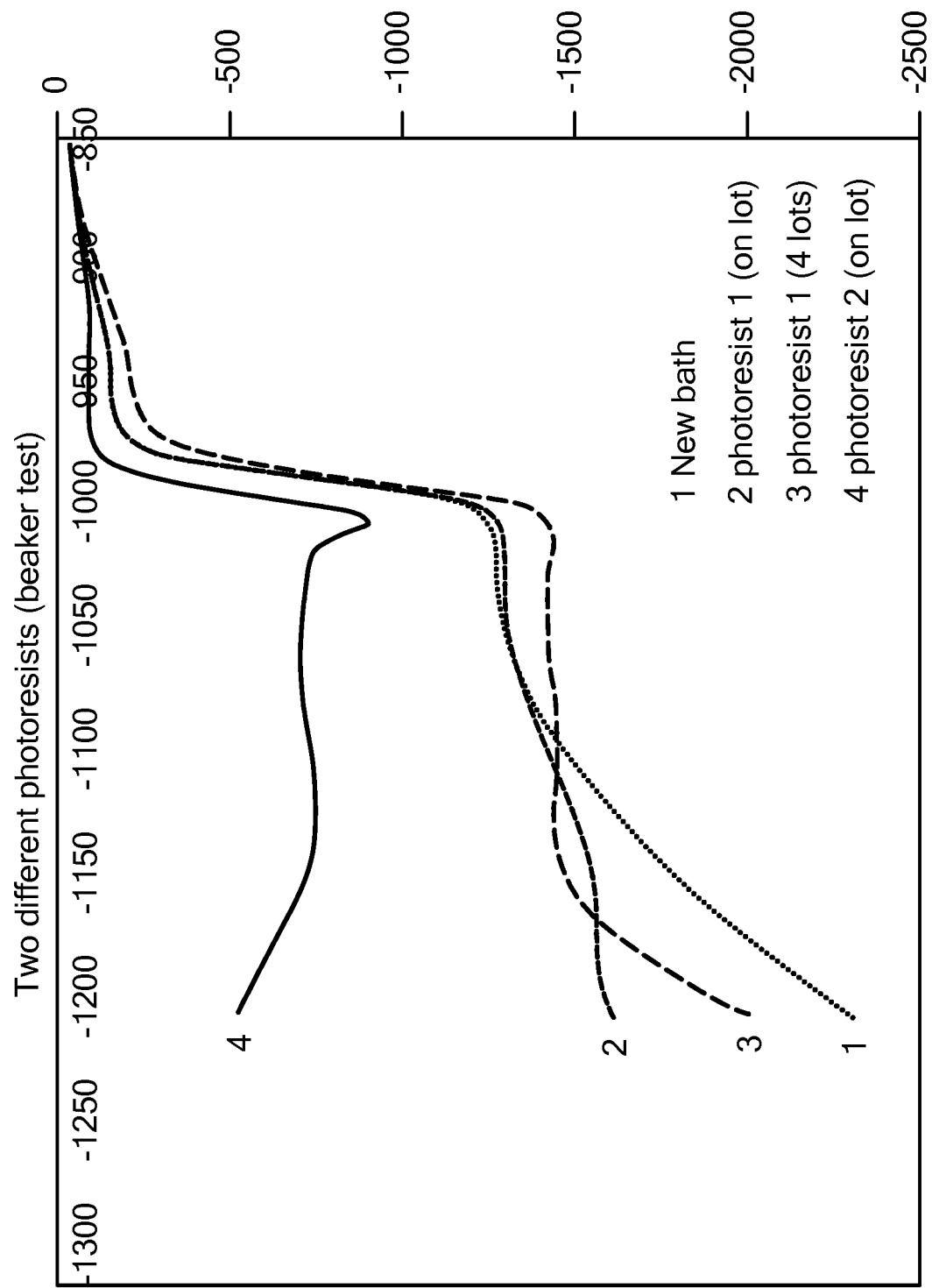
FIG. 15 is a graph showing a set of electrochemical analysis response curves showing that a signal may be extracted from the data which represents changes due to the chemistry being exposed to photoresist samples.

An example of this embodiment is a case where an electrolyte used for a plating process changes over time in such a way as to shift the potential required for depositing a desired metal. This behavior can be seen in FIG. 14, for instance, where the use of a poorly-designed anode leads to polarization, or an increased potential being required to initiate deposition. It can also be seen in FIG. 5. Once it becomes known how to detect this condition and how to adjust the power supply parameters to maintain the desired deposit properties this information can be used to continue operating the process in a way that produces acceptable product. Alternatively, if the analytical technique indicates that the electrolyte condition is drifting toward an unacceptable range, but has not yet reached the specification limit, the output of the analysis or a model based on the analysis can be used to stop additional product from running until the process is brought back under control. This method of operation could be advantageous, for instance, in the case of leachant from a microelectronic substrate, such as photoresist components, building up in the electrolyte over time. Such a condition may cause the current at a given applied potential to change as more substrates are exposed to the process, for instance, as shown in FIG. 15.

In yet another embodiment of this invention, the information collected is used to produce a quality factor that represents the quality of the deposition process, and also therefore of the deposit on the microelectronic substrate. The quality factor may be created from electroanalytical results, classical chemistry analysis results, comparisons to expected electrical waveforms, and the like. The quality factor is then monitored in order to ensure that the products being produced are of sufficient quality. If the quality factor is seen to be trending toward an unacceptable limit, action can be taken to modify the process in order to improve the quality factor or action can be taken to stop production until the process can be modified in order to produce product that has a more preferable quality factor.

Figure 16:
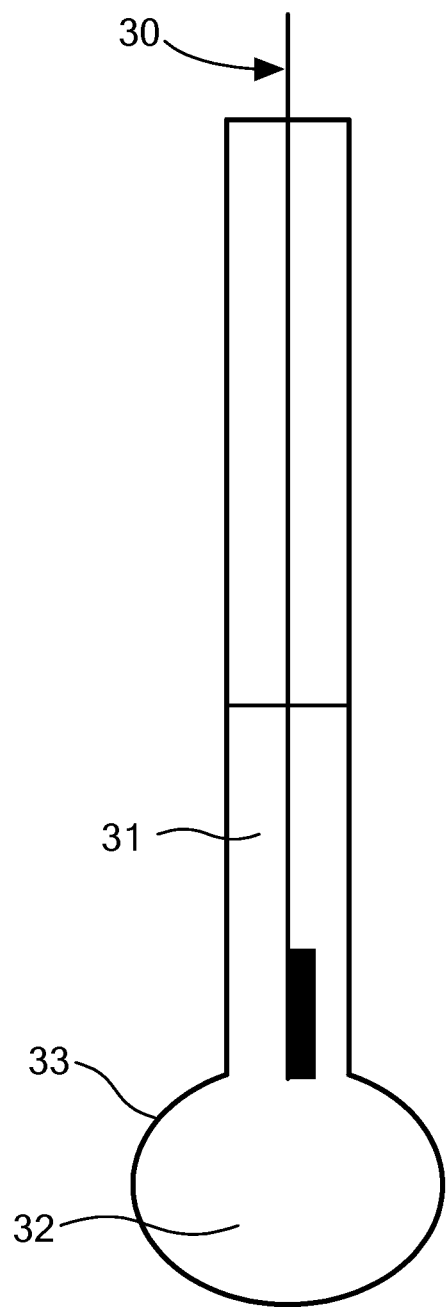
FIG. 16 shows the schematic view of the preferred reference electrode, namely a pH electrode (glass electrode).

It is further preferred that pH-electrodes are used as reference electrodes, as will be disclosed in DE 10 2012 106 831 A1. As pH-electrodes preferable glass electrodes or email electrodes are used, whereby a glass electrode according to this invention is a simple glass electrode that includes a leakage system 30, an electrode 31, an inner buffer or electrolyte 32 and a glass membrane 33, as shown in FIG. 16. The preferred pH-electrodes are no combined glass electrode, normally used as single rod measuring cell.

The pH-electrodes are preferred as they do not contaminate the bath, as they do not have to be serviced or refilled, as they are longtime stable and do not change the potential after small currents applied to the electrode as the common Ag/AgCl-electrodes or Calomel electrodes do. Furthermore, pH-electrodes do not comprise a diaphragm, which often becomes defective due to depositions.

The invention relates to an electrochemical analysis system that utilizes one or more substrates as working electrode(s) and the input power of a process power supply to provide input energy in the form of current and/or potential between the working electrode(s) and one or more counter-electrodes. The system has the capability to analyze the potential between the one or more working electrodes and at least one of: one or more reference electrodes; or one or more counter-electrodes; to provide an output signal.

Preferable one or more substrates comprise one or more substrate wafers or printed circuit boards. The electrochemical analysis system uses a fingerprinting analysis method to have an indicator of whether the chemistry and/or process is operating in the normally expected range.

An additional source of input power can be connected in parallel with the process power supply. The additional source of input power is used to augment the process power supply by supplying an additional source of current and/or potential variation which is used to aid in analysis by generating a waveform that provides information beyond that which would be provided by the process waveform alone. The output(s) of the electrochemical analysis system can be fed into a model that is used to produce a quantitative quality predictor which provides information about whether the chemistry (bath health factor) and/or process (equipment health factor) is operating within the expected range or if it is approaching or has entered an abnormal range of operation. The system can use a quality predictor in feedback with a deposition system in order to provide control of the deposition process by adjustment of the process power supply. The model and quality predictor can be designed to learn over time in order to distinguish between normal and abnormal behaviour. Product quality parameters are fed back into the model to help it refine the differentiation between good and bad process results, and to allow it to narrow down the differences between good and bad process results as more data is fed back to the model.

The invention also relates to an electrochemical analysis system that utilizes one or more substrates as working electrode(s) and has the capability to analyze the potential between the one or more working electrodes and one or more reference electrodes to provide an output signal fingerprint which is represented as one parameter as a function of a second parameter, said parameters being selected from the group of: potential difference, time, temperature, current, real component of impedance, imaginary component of impedance, frequency. Preferably the one or more substrates comprise one or more substrate wafers.

The electrochemical analysis system may use a fingerprinting analysis method to have an indicator of whether the chemistry and/or process is operating in the normally expected range.

A source of input power can be connected between the one or more substrates and one or more counter-electrodes. The additional source of input power is used to augment the process analysis by supplying an additional source of current and/or potential variation which is used to aid in analysis by generating a waveform that provides information beyond that which would be provided by the process alone.

Preferably the output(s) of the electrochemical analysis system are fed into a model that is used to produce a quantitative quality predictor which provides information about whether the chemistry (bath health factor) and/or process (equipment health factor) is operating within the expected range or if it is approaching or has entered an abnormal range of operation.

The system may use a quality predictor in feedback with a deposition system in order to provide control of the deposition process by adjustment of the process power supply. The model and quality predictor can be designed to learn over time in order to distinguish between normal and abnormal behaviour. Product quality parameters are fed back into the model to help it refine the differentiation between good and bad process results, and to allow it to narrow down the differences between good and bad process results as more data is fed back to the model.

The model and quality predictor are designed to learn over time in order to distinguish between normal and abnormal behaviour. Product quality parameters are fed back into the model to help it refine the differentiation between good and bad process results, and to allow it to narrow down the differences between good and bad process results as more data is fed back to the model.

An additional waveform of input power can be superimposed with the process waveform. The additional waveform is used to augment the process waveform by supplying an additional source of current and/or potential variation which is used to aid in analysis by generating a waveform that provides information beyond that which would be provided by the process waveform alone.

The invention also relates to a method for low-cost process start-up comprising the use of electrochemical fingerprinting of a process and/or electrolyte used in the process to provide an output that represents the process performance. The low cost aspect of the method is derived from eliminating the necessity of characterizing the process performance as a function of changing the electrolyte composition of at least one electrolyte used in the process. The method utilizes the electrochemical fingerprint of the process and/or electrolyte to represent a normally operating process.

In this embodiment the electrochemical fingerprint is produced by using at least one of the electrodes of an electrochemical deposition apparatus as the working electrode to produce the electrochemical fingerprint. The method may further comprise using the electrochemical fingerprint as at least part of an input to a model that provides a quantitative quality predictor as its output. The quality predictor is compared to the results of the process, which are fed back into the model after the process is completed, in order to be able to predict the expected relative quality of the product produced as the process continues to run.

Furthermore, the model and quality predictor may be designed to learn over time in order to compare the quality predictor to a feasibility set and/or to product quality. Product quality parameters are fed back into the model to help it refine the correlation between product quality and the model-generated quality predictor, and to allow it to improve the correlation as more data is fed back to the model.

Additionally, a decision model can be used to evaluate the input parameters and determine which ones are useful for creating a quality measurement.

The invention also provides a training set of data for an electrochemical analysis method that includes aged solutions. The training set of data for the electrochemical analysis method can be generated over a course of time while a process is running.

The invention also relates to an analysis method for an electrochemical process which identifies fault mechanisms based on the output of the analysis method. The analysis method comprising: utilizing one or more substrates as working electrode(s) and one or more reference electrodes to provide an output signal.

The analysis method can also be capable of learning fault mechanisms of the process through data feedback as the process runs.

Additionally, the system can be capable of identifying fault mechanisms associated with the substrates or system hardware.

The invention also relates to an analysis method using a high speed signal processing device to process data with acquisition rates within the range of minutes to nanoseconds, the data being used to make decisions regarding the switching on, or modification of, a process parameter which is an input parameter to an electrochemical process.

The invention claimed is:

1. An electrochemical analysis method for monitoring and controlling the quality of electrochemical deposition and/or plating processes wherein the electrochemical analysis method uses a fingerprinting analysis method of an output signal during the electrochemical deposition and/or plating process to have an indicator of whether bath chemistry and/or electrochemical deposition and/or plating process is operating in the normally expected range, wherein the method utilizes at least one substrate of the deposition and/or plating process itself as working electrode(s) of the electrochemical analysis method, wherein the at least one substrate comprises a printed circuit board or an interposer in a plating cell, and a) wherein potential between the at least one substrate and one or more reference electrodes is analyzed to provide an output signal fingerprint which is represented as potential difference as a function of time or b) wherein the input power of a process power supply to provide input energy in the form of potential between the at least one substrate and at least one counter-electrode is analyzed to provide an output signal fingerprint of the electrochemical deposition and/or plating process itself, and c) wherein the method utilizes the potential of a) or b), wherein the output signal of a) or b) are fed into a model that is used to produce a quantitative quality predictor which provides information about whether the chemistry (bath health factor) and/or process (equipment health factor) is operating within the expected range or if it is approaching or has entered an abnormal range of operation, and wherein the method further comprises, with respect to b), using the quantitative quality predictor in feedback with a deposition system in order to provide control of the deposition process by adjustment of the process power supply; and d) then, replacing the working electrode and repeating the electrochemical analysis method at least one time, wherein each working electrode is a single-use working electrode replaced after each time the electrochemical analysis method is performed.

2. The method of claim 1 further comprising, with respect to b), connecting an additional source of input power between the at least one substrate and the at least one counter-electrode as to supply an additional source of potential variation used to aid in analysis by generating a waveform that provides information beyond that which would be provided by the process alone, or using the potential between the at least one substrate and the at least one counter-electrode as an additional input signal.

3. The method of claim 1 further comprising, with respect to b), superimposing an additional waveform of input power with a process waveform, whereby the additional waveform is used to augment the process waveform by supplying an additional source of potential variation which is used to aid in analysis by generating a waveform that provides information beyond that which would be provided by the process waveform alone.

4. The method of claim 1 wherein the model and the quantitative quality predictor are designed to learn over time in order to distinguish between normal and abnormal behaviour by feeding back product quality parameters into the model to help the model refine differentiation between good and bad process results, and to allow the model to narrow down differences between good and bad process results as more data is fed back to the model.

5. A method for contaminant analysis of an acid-based electrolyte that uses the output signal fingerprint of the electrolyte to indicate the presence of at least one electrochemically active contaminant according to claim 1.

6. The method according to claim 5 wherein said acid-based electrolyte comprises a solution of at least one of the following acids in water: formic, ethanoic, propanoic, butanoic, methanesulfonic, ethanesulfonic, propanesulfonic, 2-propanesulfonic, butanesulfonic, 2-butanesulfonic, pentanesulfonic, chloropropanesulfonic, 2-hydroxyethane-1-sulfonic, 2-hydroxypropane-1-sulfonic, 2-hydroxybutane-1-sulfonic, 2-hydroxypentanesulfonic, allylsulfonic, 2-sulfoacetic, 2- or 3-sulfopropionic, sulfosuccinic, sulfomaleic, sulfofumaric, benzenesulfonic, toluenesulfonic, xylenesulfonic, nitrobenzenesulfonic, sulfobenzoic, sulfosalicylic, and benzaldehydesulfonic acids.

7. The method according to claim 1 whereby the output signal of a) or b) is used to provide feedback which, in case of b), is used to control the power supply.

8. An electrochemical analysis method for monitoring and controlling the quality of electrochemical deposition and/or plating processes wherein the electrochemical analysis method uses a fingerprinting analysis method of an output signal during the electrochemical deposition and/or plating process to have an indicator of whether bath chemistry and/or electrochemical deposition and/or plating process is operating in the normally expected range, wherein the method utilizes at least one substrate of the deposition and/or plating process itself as working electrode(s) of the electrochemical analysis method, wherein the at least one substrate is in a plating cell, and a) wherein potential between the at least one substrate and one or more reference electrodes is analyzed to provide an output signal fingerprint which is represented as potential difference as a function of time or b) wherein the input power of a process power supply to provide input energy in the form of potential between the at least one substrate and at least one counter-electrode is analyzed to provide an output signal fingerprint of the electrochemical deposition and/or plating process itself, and c) wherein the method utilizes the potential of a) or b), wherein the output signal of a) or b) are fed into a model that is used to produce a quantitative quality predictor which provides information about whether the chemistry (bath health factor) and/or process (equipment health factor) is operating within the expected range or if it is approaching or has entered an abnormal range of operation, and wherein the method further comprises, with respect to b), using the quantitative quality predictor in feedback with a deposition system in order to provide control of the deposition process by adjustment of the process power supply; and d) then, replacing the working electrode and repeating the electrochemical analysis method at least one time, wherein each working electrode is a single-use working electrode replaced after each time the electrochemical analysis method is performed.

* * * * *